(12) United States Patent
Manolakos et al.

(10) Patent No.: US 12,058,713 B2
(45) Date of Patent: Aug. 6, 2024

(54) MUTING CONFIGURATION FOR TRACKING REFERENCE SIGNAL FOR POSITIONING

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 17/384,771

(22) Filed: Jul. 25, 2021

(65) Prior Publication Data

US 2022/0078815 A1    Mar. 10, 2022

Related U.S. Application Data

(60) Provisional application No. 63/076,418, filed on Sep. 10, 2020.

(51) Int. Cl.
*H04W 72/50* (2023.01)
*H04L 5/00* (2006.01)
(Continued)

(52) U.S. Cl.
CPC ......... *H04W 72/535* (2023.01); *H04L 5/0051* (2013.01); *H04W 72/0446* (2013.01);
(Continued)

(58) Field of Classification Search
CPC ......... H04W 72/1257; H04W 72/0446; H04W 72/0453; H04W 72/1226; H04W 72/1263;
(Continued)

(56) References Cited

U.S. PATENT DOCUMENTS 9,148,818 B2 * 9/2015 Yue ....................... H04L 5/0051
9,967,834 B2 * 5/2018 Teng ................. H04W 52/0254
(Continued)

OTHER PUBLICATIONS

International Search Report and Written Opinion—PCT/US2021/043106—ISA/EPO—Oct. 13, 2021.
(Continued)

*Primary Examiner* — Justin T Van Roie
(74) *Attorney, Agent, or Firm* — SUNSTEIN LLP/Qualcomm

(57) ABSTRACT

A method of managing positioning reference signal transmission includes: instructing a transmission point to apply a muting pattern regarding transmission of a reference signal including first and second reference signal resources, where a first instance of the first reference signal resource includes one or more first resource elements across one or more first OFDM symbols within a slot, and a second instance of the second reference signal resource includes one or more second resource elements across one or more second OFDM symbols within the slot; and instructing the transmission point to transmit, unmuted, at least one of the one or more second resource elements, of at least one of the one or more second OFDM symbols, despite the muting pattern indicating to mute transmission of the at least one of the one or more second resource elements of the at least one of the one or more second OFDM symbols.

29 Claims, 16 Drawing Sheets

(51) Int. Cl.
  *H04W 72/0446* (2023.01)
  *H04W 72/0453* (2023.01)
  *H04W 72/1263* (2023.01)
  *H04W 72/54* (2023.01)
(52) U.S. Cl.
  CPC ... *H04W 72/0453* (2013.01); *H04W 72/1263* (2013.01); *H04W 72/54* (2023.01)
(58) Field of Classification Search
  CPC ... H04L 5/0051; H04L 5/0094; H04L 5/0048; G01S 1/0428; G01S 5/02
  See application file for complete search history.

(56) References Cited

U.S. PATENT DOCUMENTS

| | | | | |
|---|---|---|---|---|
| 2015/0003343 | A1* | 1/2015 | Li | H04L 5/0073 370/329 |
| 2016/0080106 | A1* | 3/2016 | Srinivasan | H04W 64/00 455/1 |

OTHER PUBLICATIONS

OPPO: "Discussion on UL Reference Signals for NR Positioning", 3GPP Draft, 3GPP TSG RAN WG1 #98, R1-1908357, 3rd Generation Partnership Project (3GPP), Mobile Competence Centre, 650, Route Des Lucioles, F-06921, Sophia-Antipolis Cedex, France, vol. RAN WG1, No. Prague, CZ, Aug. 26, 2019-Aug. 30, 2019, Aug. 17, 2019 (Aug. 17, 2019), XP051764966, 6 pages, Retrieved from the Internet: URL: http://www.3gpp.org/ftp/tsg_ran/WG1_RL1/TSGR1_98/Docs/R1-1908357.zip [retrieved on Aug. 17, 2019] the whole document.

Qualcomm Incorporated: "DL Reference Signals for NR Positioning," 3GPP Draft, 3GPP TSG RAN WG1 #98, R1-1909278, 3rd Generation Partnership Project (3GPP), Mobile Competence Centre, 650, Route Des Lucioles, F-06921, Sophia-Antipolis Cedex, France, vol. RAN WG1. No. Prague, Czech Republic, Aug. 26, 2019-Aug. 30, 2019, Aug. 17, 2019 (Aug. 17, 2019), XP051765883, 20 pages, Retrieved from the Internet: URL: http://www.3gpp.org/ftp/tsg_ran/WG1_RL1/TSGR1_98/Docs/R1-1909278.zip [retrieved on Aug. 17, 2019], the whole document.

Qualcomm Incorporated: "Evaluation of Achievable Positioning Accuracy & Latency", 3GPP Draft, 3GPP TSG RAN WG1 #102-e, R1-2006809, 3rd Generation Partnership Project (3GPP), Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 8, 2020 (Aug. 8, 2020), XP051918259, 20 pages, Retrieved from the Internet: URL: https://ftp.3gpp.org/tsg_ran/WG1_RL1/TSGR1_102-e/Docs/R1-2006809.zip R1-2006809.docx [retrieved on Aug. 8, 2020], the whole document.

Samsung: "Discussion on CSI-RS Design for NR," 3GPP Draft, 3GPP TSG RAN WG1 #85, R1-164010, CSI-RS Design for NR, 3rd Generation Partnership Project (3GPP), Mobile Competence Centre, 650, Route Des Lucioles, F-06921, Sophia-Antipolis Cedex, France, vol. RAN WG1, No. Nanjing, China, May 23, 2016-May 27, 2016, May 13, 2016 (May 13, 2016), XP051090298, 4 pages, Retrieved from the Internet: URL: http://www.3gpp.org/ftp/tsg_ran/WG1_RL1/TSGR1_85/Docs/ [retrieved on May 13, 2016], the whole document.

CATT: "DL and UL Reference Signals for NR Positioning", 3GPP TSG RAN WG1 #96bis, R1-1905346, DL and UL Reference Signals for NR Positioning, 3rd Generation Partnership Project, Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 3, 2019, 27 Pages, XP051707421, Paragraph [2.6.4], Figures 7-11, Sect. 2.5.

* cited by examiner

1900

```
       ┌──────────────────────────────────────────┐
       │ Instructing a transmission point to apply a muting │
       │ pattern regarding transmission of a reference signal │
       │ comprising a first reference signal resource and a │
       │ second reference signal resource, wherein a first │
       │ instance of the first reference signal resource   │──── 1910
       │ comprises one or more first resource elements     │
       │ across one or more first orthogonal frequency     │
       │ division multiplex (OFDM) symbols within a slot,  │
       │ and a second instance of the second reference     │
       │ signal resource comprises one or more second      │
       │ resource elements across one or more second       │
       │ OFDM symbols within the slot                      │
       └──────────────────────────────────────────┘
                              │
                              ▼
       ┌──────────────────────────────────────────┐
       │ Instructing the transmission point to transmit,   │
       │ unmuted, at least one of the one or more second   │
       │ resource elements, of at least one of the one or  │
       │ more second OFDM symbols, despite the muting      │──── 1920
       │ pattern indicating to mute transmission of the at │
       │ least one of the one or more second resource      │
       │ elements of the at least one of the one or more   │
       │ second OFDM symbols                               │
       └──────────────────────────────────────────┘
```

FIG. 19

MUTING CONFIGURATION FOR TRACKING REFERENCE SIGNAL FOR POSITIONING

CROSS-REFERENCE TO RELATED APPLICATIONS

This application claims the benefit of U.S. Provisional Application No. 63/076,418, filed Sep. 10, 2020, entitled "MUTING CONFIGURATION FOR TRACKING REFERENCE SIGNAL FOR POSITIONING," assigned to the assignee hereof, and the entire contents of which are hereby incorporated herein by reference.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example network entity includes: a transmitter; a memory; and a processor communicatively coupled to the transmitter and the memory and configured to: instruct a transmission point (TP) to apply a muting pattern regarding transmission of a reference signal including a first reference signal resource and a second reference signal resource, where a first instance of the first reference signal resource includes one or more first resource elements across one or more first orthogonal frequency division multiplex (OFDM) symbols within a slot, and a second instance of the second reference signal resource includes one or more second resource elements across one or more second OFDM symbols within the slot; and instruct the TP to transmit, unmuted, at least one of the one or more second resource elements, of at least one of the one or more second OFDM symbols, despite the muting pattern indicating to mute transmission of the at least one of the one or more second resource elements of the at least one of the one or more second OFDM symbols.

Another example network entity includes: first means for instructing a transmission point (TP) to apply a muting pattern regarding transmission of a reference signal including a first reference signal resource and a second reference signal resource, where a first instance of the first reference signal resource includes one or more first resource elements across one or more first orthogonal frequency division multiplex (OFDM) symbols within a slot, and a second instance of the second reference signal resource includes one or more second resource elements across one or more second OFDM symbols within the slot; and second means for instructing the TP to transmit, unmuted, at least one of the one or more second resource elements, of at least one of the one or more second OFDM symbols, despite the muting pattern indicating to mute transmission of the at least one of the one or more second resource elements of the at least one of the one or more second OFDM symbols.

An example method of managing positioning reference signal transmission includes: instructing a transmission point (TP) to apply a muting pattern regarding transmission of a reference signal including a first reference signal resource and a second reference signal resource, where a first instance of the first reference signal resource includes one or more first resource elements across one or more first orthogonal frequency division multiplex (OFDM) symbols within a slot, and a second instance of the second reference signal resource includes one or more second resource elements across one or more second OFDM symbols within the slot; and instructing the TP to transmit, unmuted, at least one of the one or more second resource elements, of at least one of the one or more second OFDM symbols, despite the muting pattern indicating to mute transmission of the at least one of the one or more second resource elements of the at least one of the one or more second OFDM symbols.

An example non-transitory, processor-readable storage medium includes processor-readable instructions configured to a cause a processor of a network entity, in order to manage transmission of positioning reference signals, to: instruct a transmission point (TP) to apply a muting pattern regarding transmission of a reference signal including a first reference signal resource and a second reference signal resource, where a first instance of the first reference signal resource includes one or more first resource elements across one or more first orthogonal frequency division multiplex (OFDM) symbols within a slot, and a second instance of the second reference signal resource includes one or more second resource elements across one or more second OFDM symbols within the slot; and instruct the TP to transmit, unmuted, at least one of the one or more second resource elements, of at least one of the one or more second OFDM symbols, despite the muting pattern indicating to mute transmission of the at least one of the one or more second resource elements of the at least one of the one or more second OFDM symbols.

BRIEF DESCRIPTION OF THE DRAWINGS

FIG. 19 is a block flow diagram of a method of managing positioning reference signal transmission.

DETAILED DESCRIPTION

Figure 1:
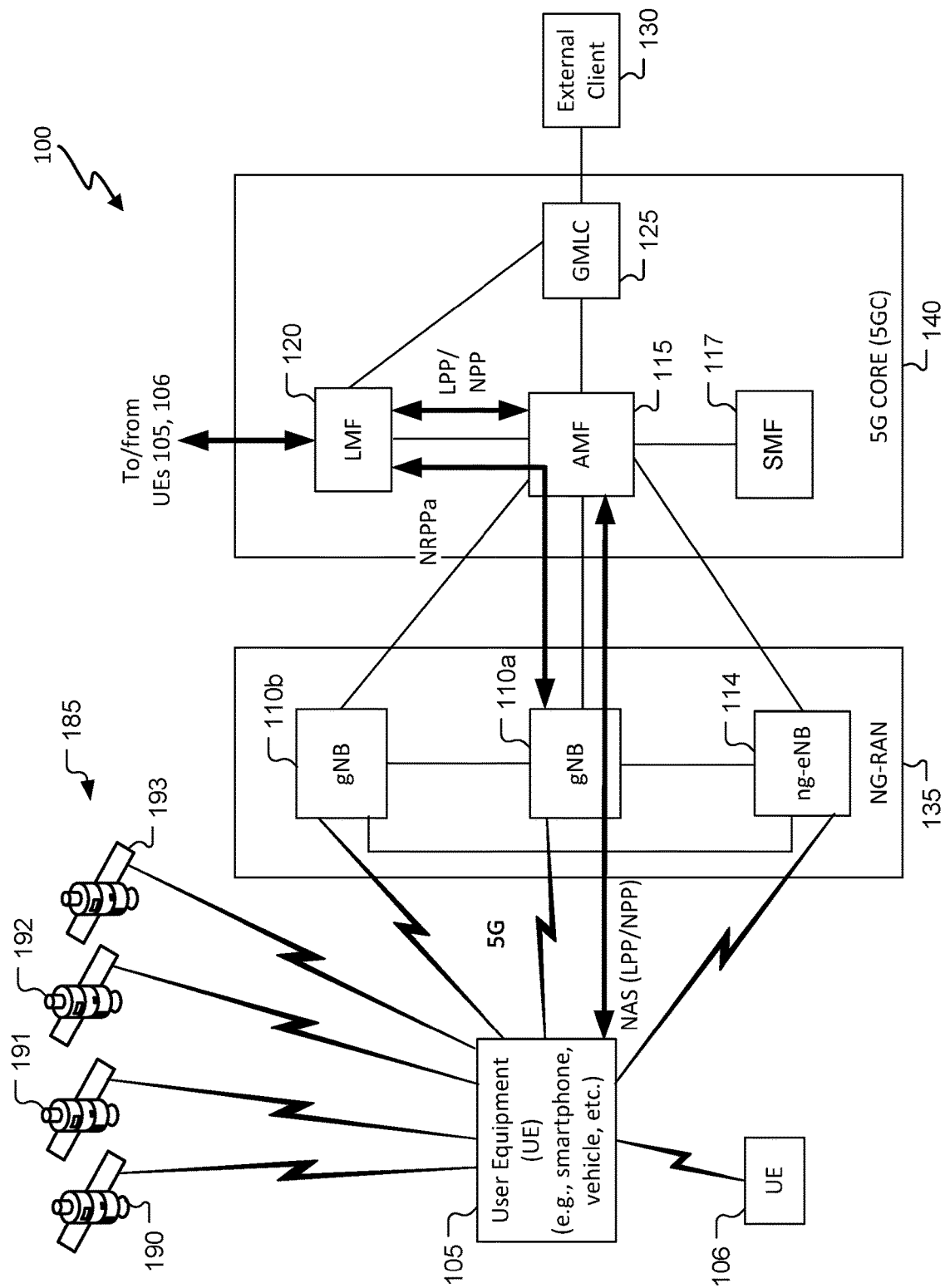
FIG. 1 is a simplified diagram of an example wireless communications system.

Techniques are discussed herein for resource-based muting of reference signals. For example, one or more resources of a reference signal for a given time period, e.g., a symbol, may be muted while one or more other resources of the reference signal for the same time period may be transmitted unmuted. One or more indications of a time-based muting pattern to mute transmission may be overridden. For example, a time-based muting pattern may indicate to mute resource elements for an instance (or other time amount of a reference signal) and yet one or more of the resource elements may be transmitted, e.g., if configured by default, or if indicated as part of a resource-based muting configuration. Other examples, however, may be implemented.

Items and/or techniques described herein may provide one or more of the following capabilities, as well as other capabilities not mentioned. Orthogonality of a reference signal may be improved while providing some of the content of the reference signal, e.g., a portion of the reference signal that a user equipment expects to be transmitted always for the reference signal. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
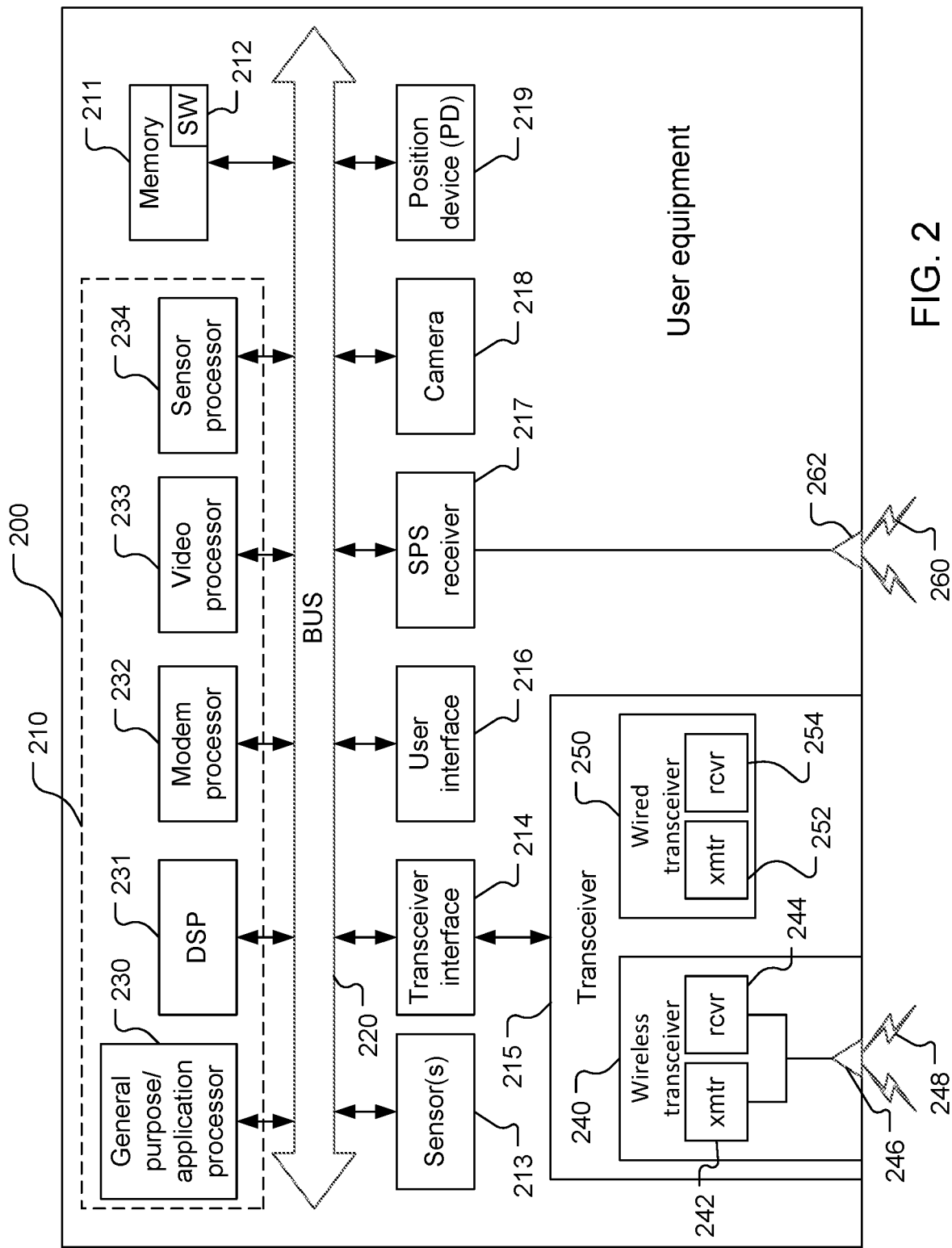
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
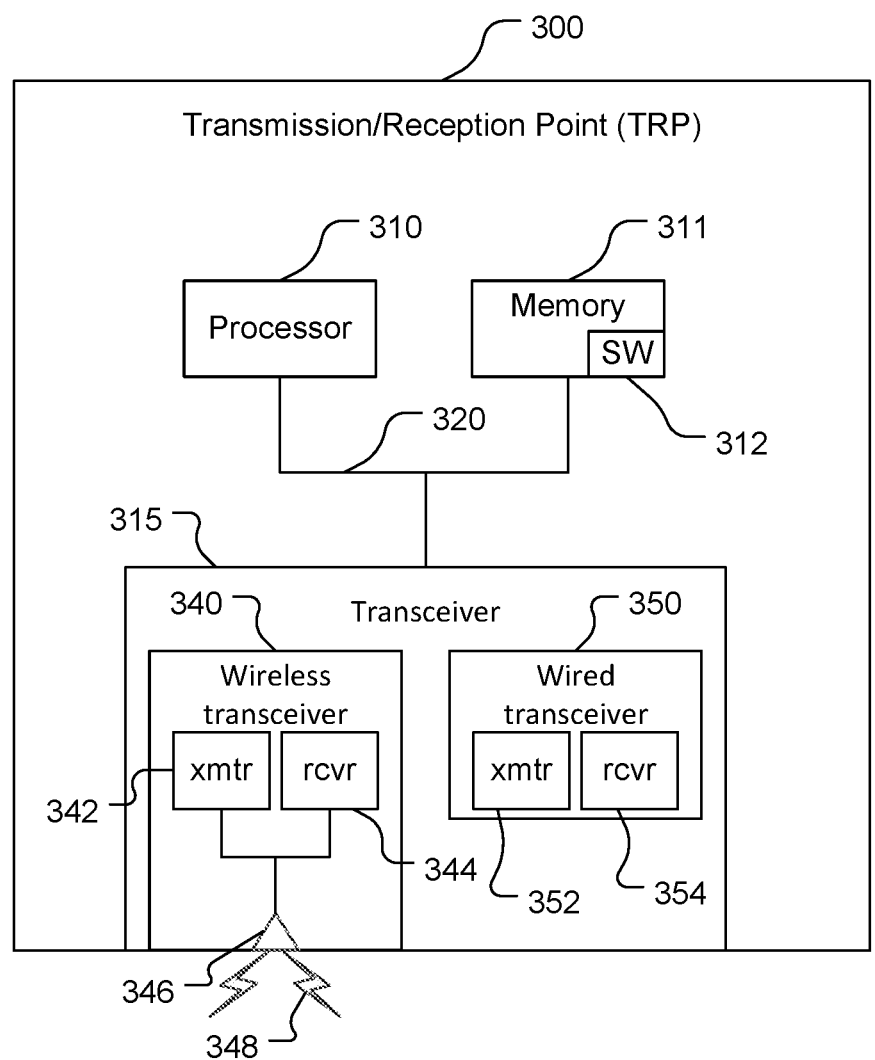
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
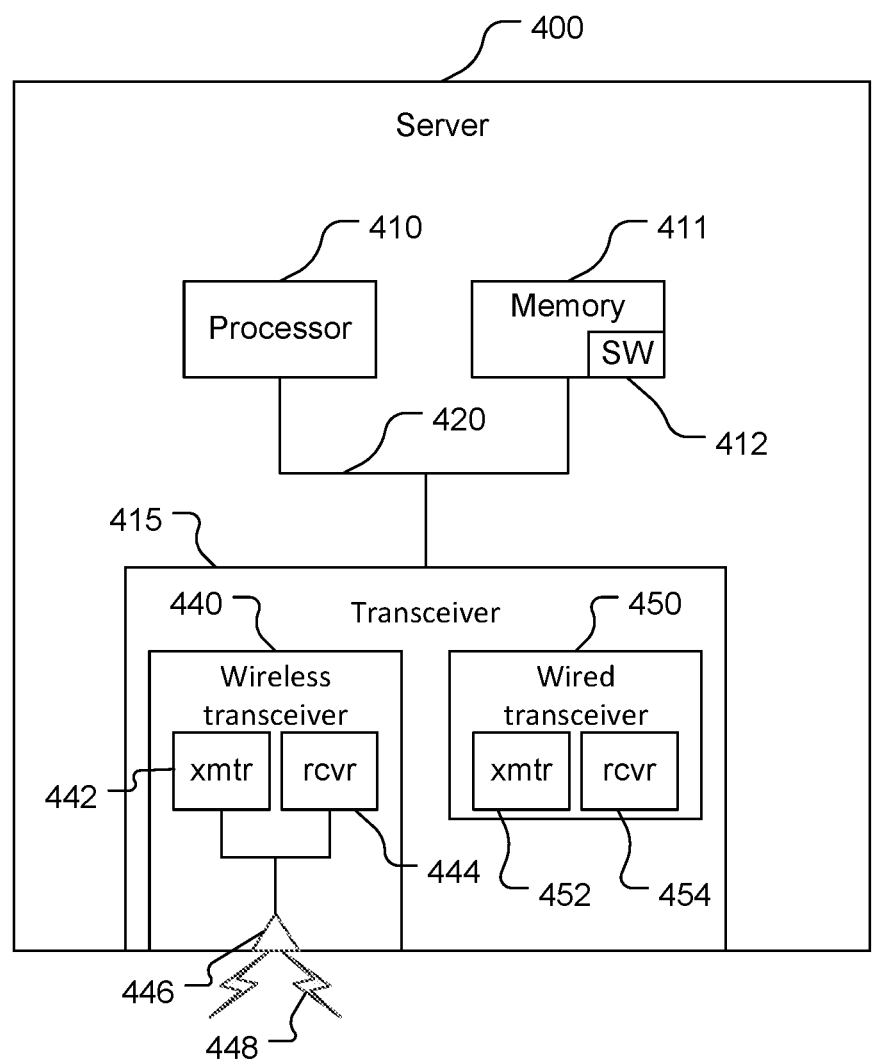
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, TRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5:
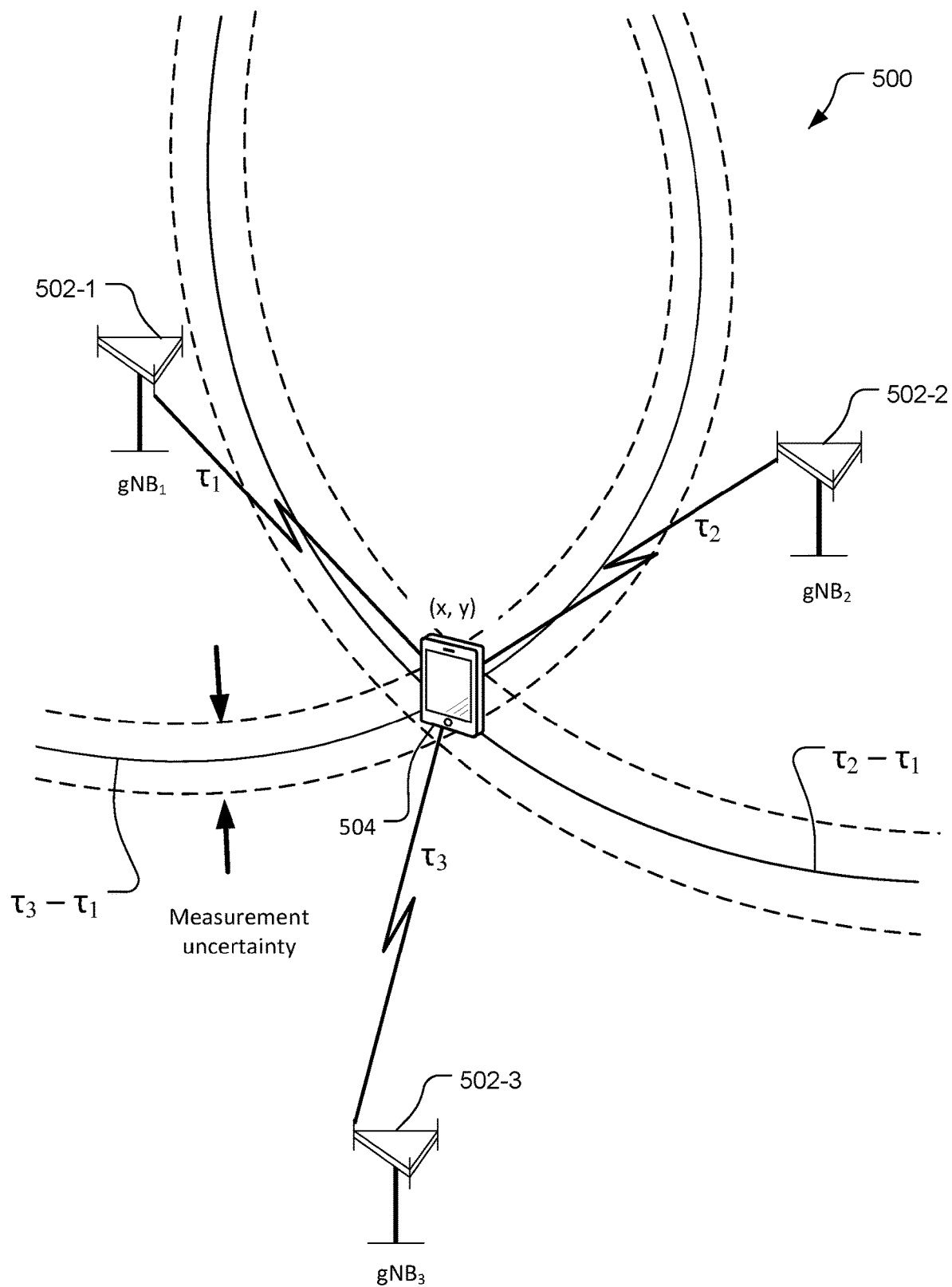
FIG. 5 is a simplified diagram of a technique for determining a position of a mobile device using an OTDOA technique.

Referring to FIG. 5, an example wireless communications system 500 includes base stations 502-1, 502-2, 502-3 and a UE 504. The UE 504 may correspond to any of the UEs described herein, and is configured to calculate an estimated position of the UE 504, and/or assist another entity (e.g., a base station or core network component, another UE, a location server, a third party application, etc.) to calculate an estimate of the position of the UE 504. The UE 504 may communicate wirelessly with the base stations 502-1, 502-2, and 502-3, which may correspond to any combination of the base stations described herein, using RF signals and standardized protocols for the modulation of the RF signals and the exchange of information packets. By extracting different types of information from the exchanged RF signals, and utilizing the layout of the wireless communications system 500 (e.g., the locations of the base stations), the UE 504 may determine the position of the UE 504 and/or assist in the determination of the position of the UE 504 in a predefined reference coordinate system. The UE 504 may be configured to specify the position of the UE 504 using a two-dimensional (2D) coordinate system and/or a three-dimensional (3D) coordinate system. Additionally, while FIG. 5 illustrates one UE 504 and three base stations 502-1, 502-2, 502-3, more UEs 504 may be used and/or more or fewer base stations may be used.

To support position estimates, the base stations 502-1, 502-2, 502-3 may be configured to broadcast reference signals (e.g., PRS, CRS, etc.) to enable the UE 504 to measure characteristics of such reference signals. For example, the observed time difference of arrival (OTDOA) positioning method is a multi-lateration method in which the UE 504 measures the time difference, known as a reference signal time difference (RSTD), between specific reference signals (e.g., PRS, CRS, CSI-RS, etc.) transmitted by different pairs of network nodes (e.g., base stations, antennas of base stations, etc.) and either reports these time differences to a location server, such as the LMF 120, or computes a location estimate from these time differences.

Generally, RSTDs are measured between a reference network node (e.g., the base station 502-1 in the example of FIG. 5) and one or more neighbor network nodes (e.g., the base stations 502-2 and 502-3 in the example of FIG. 5). The reference network node remains the same for all RSTDs measured by the UE 504 for any single positioning use of OTDOA and would typically correspond to the serving cell for the UE 504 or another nearby cell with good signal strength at the UE 504. Where a measured network node is a cell supported by a base station, the neighbor network nodes would normally be cells supported by base stations different from the base station for the reference cell and may have good or poor signal strength at the UE 504. The location computation can be based on the measured time differences (e.g., RSTDs) and knowledge of the network nodes' locations and relative transmission timing (e.g., whether network nodes are accurately synchronized or whether each network node transmits with some known time difference relative to other network nodes).

To assist positioning operations, a location server (e.g., the LMF 120) may provide OTDOA assistance data to the UE 504 for the reference network node (e.g., the base station 502-1 in the example of FIG. 5) and the neighbor network nodes (e.g., the base stations 502-2 and 502-3 in the example of FIG. 5) relative to the reference network node. For example, the assistance data may provide the center channel frequency of each network node, various reference signal configuration parameters (e.g., the number of consecutive positioning subframes, periodicity of positioning subframes, muting sequence, frequency hopping sequence, reference signal identifier (ID), reference signal bandwidth), a network node global ID, and/or other cell-related parameters applicable to OTDOA. The OTDOA assistance data may indicate the serving cell for the UE 504 as the reference network node.

In some cases, OTDOA assistance data may also include "expected RSTD" parameters that provide the UE 504 with information about the RSTD values that the UE 504 is expected to measure, at the current location of the UE 504, between the reference network node and each neighbor network node, together with an uncertainty of the expected RSTD value. The expected RSTD, together with the associated uncertainty, may define a search window for the UE 504 within which the UE 504 is expected to receive the reference signal for measuring the RSTD value. The search window could be defined in other ways, e.g., by a start time and an end time. OTDOA assistance information may include reference signal configuration information parameters that help a UE to determine when a reference signal positioning occasion occurs for signals received from various neighbor network nodes relative to reference signal positioning occasions for the reference network node, and to determine the reference signal sequence transmitted from various network nodes in order to measure a signal time of arrival (ToA) or RSTD.

The location server (e.g., the LMF 120) may send the assistance data to the UE 504 and/or the assistance data may originate directly from the network nodes (e.g., the base stations 502-1, 502-2, 502-3), for example in periodically-broadcast overhead messages, etc. Also or alternatively, the UE 504 may be configured to detect neighbor network nodes without the use of assistance data.

Assistance data may be based on a coarse location determined for the UE. For example, E-CID may be used to determine a coarse location for the UE 504 and this coarse location, and known locations of the of the base stations 502-1, 502-2, 502-3, used to determine the expected RSTD values.

The UE 504 may be configured to measure (e.g., based in part on the assistance data) and (optionally) report the RSTDs between reference signals received from pairs of network nodes. Using the RSTD measurements, the known absolute or relative transmission timing of each network node, and the known position(s) of the transmitting antennas for the reference and neighboring network nodes, the network (e.g., the LMF 120, the base stations 502-1, 502-2, 502-3) and/or the UE 504 may estimate a position of the UE 504. More particularly, the RSTD for a neighbor network node "k" relative to a reference network node "Ref" may be given as $(ToA_k - ToA_{Ref})$, where the ToA values may be measured modulo one subframe duration (1 ms) to remove the effects of measuring different subframes at different times. In the example of FIG. 5, the measured time differences between the reference cell of base station 502-1 and the cells of neighboring base stations 502-2 and 502-3 are represented as $\tau_2 - \tau_1$ and $\tau_3 - \tau_1$, where $\tau_1$, $\tau_2$, and $\tau_3$ represent the ToA of a reference signal from the transmitting antenna(s) of base station 502-1, 502-2, and 502-3, respectively. The UE 504 may convert the ToA measurements for different network nodes to RSTD measurements and (optionally) send them to the LMF 120. Using (i) the RSTD measurements, (ii) the known absolute or relative transmission timing of each network node, (iii) the known position(s) of physical transmitting antennas for the reference and neighboring network nodes, and/or (iv) directional reference signal characteristics such as a direction of transmission, the position of the UE 504 may be determined (e.g., by the UE 504 and/or the LMF 120).

Still referring to FIG. 5, to obtain a location estimate using OTDOA measured time differences, the network nodes' locations and relative transmission timing may be provided to the UE 504 by a location server (e.g., the LMF 120). A location estimate for the UE 504 may be obtained (e.g., by the UE 504 and/or by the LMF 120) from OTDOA measured time differences and from other measurements made by the UE 504 (e.g., measurements of signal timing from global positioning system (GPS) or other global navigation satellite system (GNSS) satellites). In these implementations, known as hybrid positioning, the OTDOA measurements may contribute towards obtaining the location estimate for the UE 504 but may not wholly determine the location estimate.

Uplink time difference of arrival (UTDOA) is a similar positioning method to OTDOA, but is based on uplink reference signals (e.g., positioning sounding reference signals (SRS), also called uplink positioning reference signals (UL-PRS)) transmitted by the UE (e.g., UE 504). Further, transmission and/or reception beamforming at the base station 502-1, 502-2, 502-3 and/or the UE 504 may help provide wideband bandwidth at the cell edge for increased precision. Beam refinements may also leverage channel reciprocity procedures in 5G NR.

In NR, coarse time-synchronization across gNBs (e.g., within a cyclic prefix (CP) duration of the OFDM symbols) may be provided. Round-trip-time (RTT)-based methods may use coarse timing synchronization to determine location, and as such, are practical positioning methods in NR.

Figure 6:
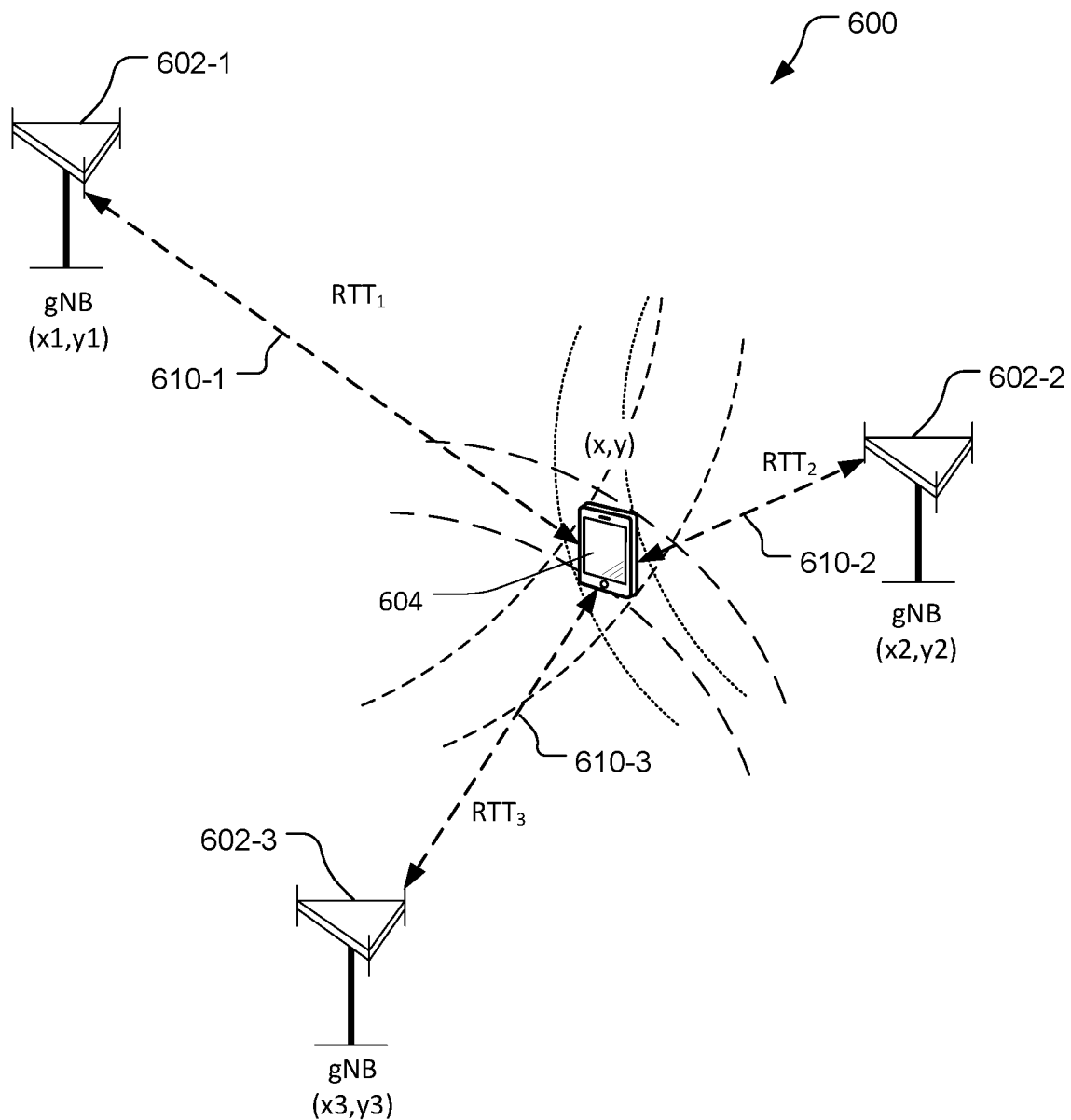
FIG. 6 is a simplified diagram of a prior art technique for determining a position of a mobile device using a multi-RTT technique.

Referring to FIG. 6, an example wireless communications system 600 for multi-RTT-based position determination includes a UE 604 (which may correspond to any of the UEs described herein) and base stations 602-1, 602-2, 602-3. The UE 604 may be configured to calculate a position estimate of the UE 604, and/or to assist another entity (e.g., a base station or core network component, another UE, a location server, a third party application, etc.) to calculate the position estimate of the UE 604. The UE 604 may be configured to communicate wirelessly with the base stations 602-1, 602-2, 602-3 (which may correspond to any of the base stations described herein) using RF signals and standardized protocols for the modulation of the RF signals and the exchange of information packets.

To determine the position (x, y) of the UE 604, the entity determining the position of the UE 604 may use the locations of the base stations 602-1, 602-2, 602-3, which may be represented in a reference coordinate system as $(x_k, y_k)$, where k=1, 2, 3 in the example of FIG. 6. Where one of the base stations 602-2 (e.g., the serving base station) or the UE 604 determines the position of the UE 604, the locations of the involved base stations 602-1, 602-3 may be provided to the serving base station 602-2 and/or the UE 604 by a location server with knowledge of the network geometry (e.g., the LMF 120). Alternatively, the location server may determine the position of the UE 604 using the known network geometry.

Either the UE 604 or the respective base station 602-1, 602-2, 602-3 may determine distances $d_k$ (where k=1, 2, 3) between the UE 604 and the respective base stations 602-1, 602-2, 602-3. Determining an RTT 610-1, 610-2, 610-3 of signals exchanged between the UE 604 and a respective one of the base stations 602-1, 602-2, 602-3 may be performed and the RTT converted to the distance $d_k$. RTT techniques can measure the time between sending a signaling message (e.g., a reference RF signal) and receiving a response. These methods may utilize calibration to remove/reduce processing and/or hardware delays. The processing delays for the UE 604 and the base stations 602-1, 602-2, 602-3 may, in some environments, be assumed to be the same, but may not be accurate.

The distances $d_k$ may be used by the UE 604, a base station 602-1, 602-2, 602-3, and/or the location server to solve for the position (x, y) of the UE 604 by using one or more of a variety of known geometric techniques, such as, for example, trilateration. As shown in FIG. 6, the position of the UE 604 ideally lies at the common intersection of three semicircles, each semicircle being defined by radius $d_k$ and center ($x_k$, $y_k$), where k=1, 2, 3.

Figure 7:
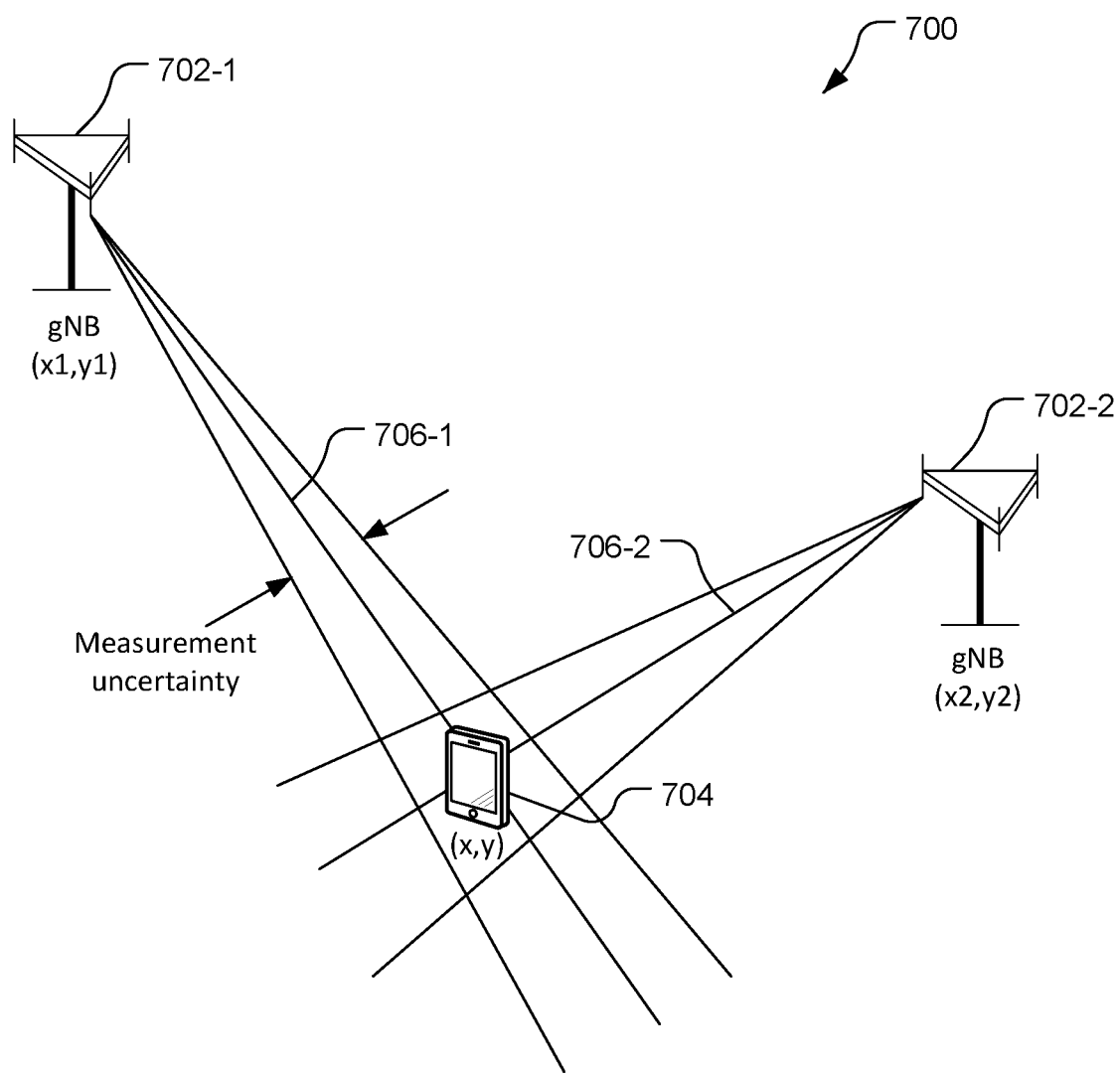
FIG. 7 is a simplified diagram of a prior art technique for determining a position of a mobile device using an AoD technique.

Referring to FIG. 7, a wireless communications system 700 for determining UE position using angle of departure (AoD) information includes base stations 702-1, 702-2, and a UE 704. As shown, RF beams 706-1, 706-2 may be sent by the base stations 702-1, 702-2 in straight lines to the UE 704. The DL AoD, relative to the base stations 702-1, 702-2, of the RF beams 706-1, 706-2 received by the UE 704 may be determined. The AoD information and the locations of the base stations 702-1, 702-2 may be used to determine an intersection of the RF beams 706-1, 706-2, including measurement uncertainty for each of the RF beams 706-1, 706-2, with the intersection corresponding to the location (x, y) of the UE 704. The AoDs may be in a horizontal plane or in three dimensions. While the system 700 illustrates AoD position determination, angle of arrival (AoA) may be used to determine UE position. For UL AoA position determination, the angle of arrival of beams from the UE 704 at the base stations 702-1, 702-2 may be found, and this information along with the locations of the base stations 702-1, 702-2 may be used to determine the location of the UE 704.

Figure 8:
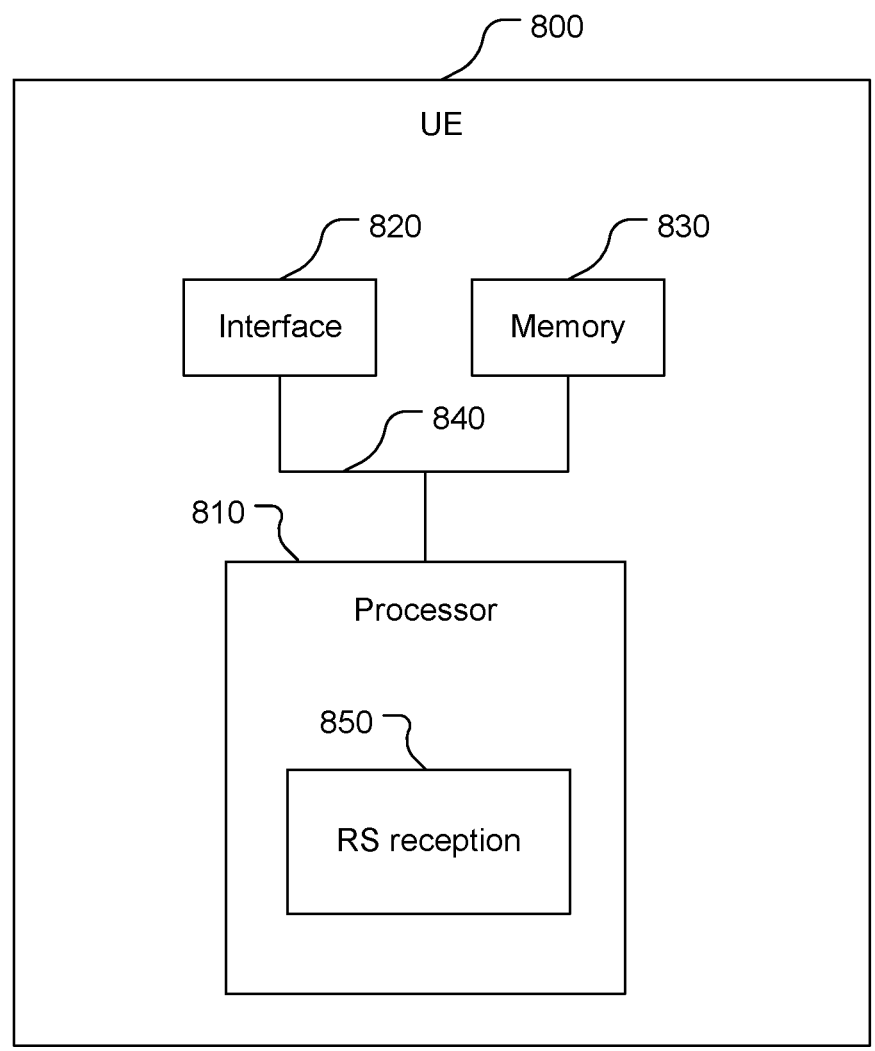
FIG. 8 is a simplified block diagram of an example user equipment.

Referring to FIG. 8, with further reference to FIG. 2, a UE 800 includes a processor 810, an interface 820, and a memory 830 communicatively coupled to each other by a bus 840. The UE 800 may include the components shown in FIG. 8, and may include one or more other components such as any of those shown in FIG. 2 such that the UE 200 may be an example of the UE 800. The interface 820 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 820 may include the wired transmitter 252 and/or the wired receiver 254. The memory 830 may be configured similarly to the memory 211, e.g., including software with processor-readable instructions configured to cause the processor 810 to perform functions.

The description herein may refer only to the processor 810 performing a function, but this includes other implementations such as where the processor 810 executes software (stored in the memory 830) and/or firmware. The description herein may refer to the UE 800 performing a function as shorthand for one or more appropriate components (e.g., the processor 810 and the memory 830) of the UE 800 performing the function. The processor 810 (possibly in conjunction with the memory 830 and, as appropriate, the interface 820) includes a reference signal (RS) reception unit 850. The RS reception unit 850 may coordinate reception and measurement of one or more reference signals, including making any appropriate adjustment for any reference signal muting.

Figure 9:
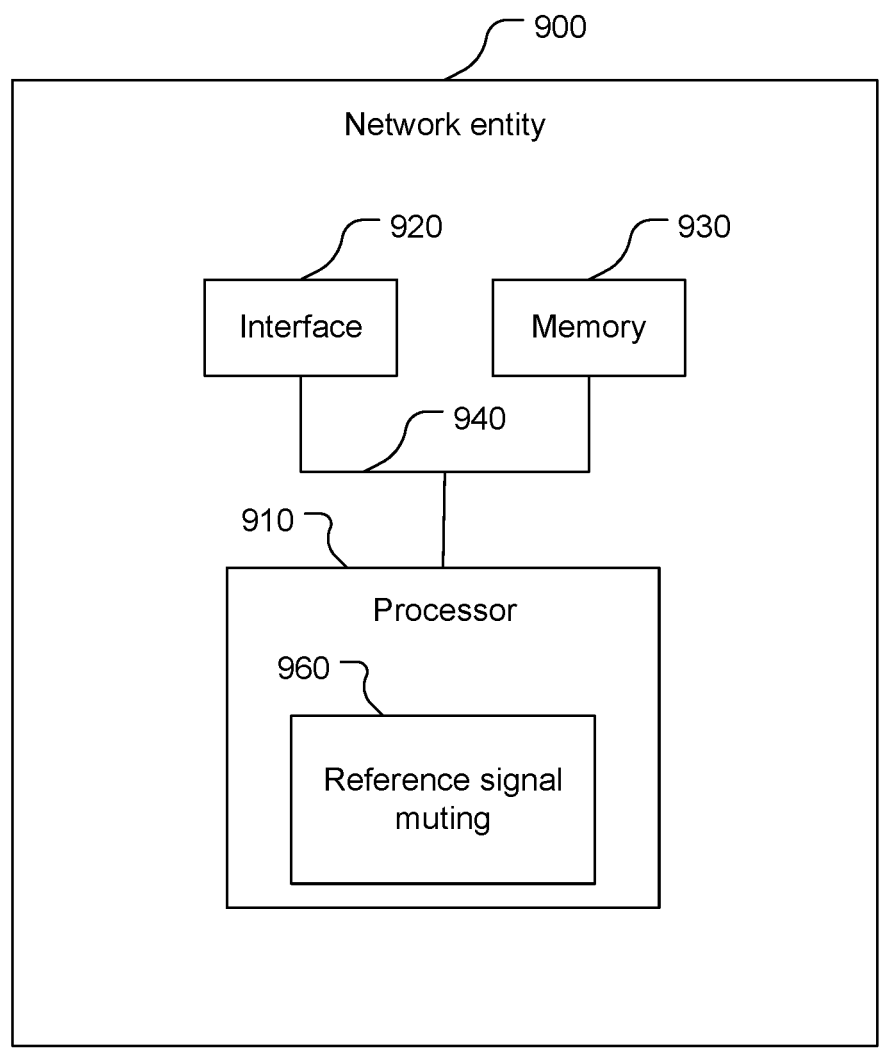
FIG. 9 is a simplified block diagram of an example of a network entity.

Referring to FIG. 9, with further reference to FIGS. 1-4, a network entity 900, which may be an example of the TRP 300 shown in FIG. 3, an example of the server 400 (e.g., an LMF) shown in FIG. 4, or a combination thereof, includes a processor 910, an interface 920, and a memory 930 communicatively coupled to each other by a bus 940. The network entity 900 may include some or all of the components shown in FIG. 9, and may include one or more other components such as any of those shown in FIG. 3 and/or FIG. 4. The interface 920 may include one or more of the components of the transceiver 315 and/or the transceiver 415. The memory 930 may be configured similarly to the memory 311 and/or the memory 411, e.g., including software with processor-readable instructions configured to cause the processor 910 to perform functions.

The description herein may refer only to the processor 910 performing a function, but this includes other implementations such as where the processor 910 executes software (stored in the memory 930) and/or firmware. The description herein may refer to the network entity 900 performing a function as shorthand for one or more appropriate components (e.g., the processor 910 and the memory 930) of the network entity 900 performing the function. The processor 910 (possibly in conjunction with the memory 930 and, as appropriate, the interface 920) includes an RS muting unit 960. The RS muting unit 960 may be configured to perform one or more functions for determining one or more RS muting patterns. For example, if the network entity 900 is an example of the server 400 only, then the RS muting unit 960 may be configured to send one or more muting parameters to the TRP 300 for the TRP to implement for transmission of a reference signal (RS) such as a PRS or a TRS (tracking reference signal). As another example, if the network entity 900 includes the TRP 300, then the RS muting unit 960 may be configured to transmit RS resources in accordance with one or more muting patterns, and may be configured to override at least one of the muting pattern(s).

RS Muting Configurations

The TRP 300 may be configured, e.g., by interaction with the server 400 (e.g., by communications exchanged with and/or instructions received from the server 400) and/or by the software 312, to send downlink reference signals (DL-RS), e.g., DL-PRS or DL-TRS, per a schedule. According to the schedule, the TRP 300 may send the DL-RS signals intermittently, e.g., periodically at a consistent interval from an initial transmission. The TRP 300 may be configured to send one or more RS resource sets. Each of the resource sets may comprise multiple resources, with each resource being a beam transmitted by the TRP 300, and each resource being configured with a slot offset and a symbol offset within a slot. A DL-PRS resource may also be configured with a number of consecutive symbols that the resource may occupy. Each RS resource is associated with one antenna port or beam, transmits a DL-RS signal, and may repeat the transmission across slots, with each transmission being called a repetition such that there may be multiple repetitions in a resource. Each RS resource set is associated with a periodicity. Every time all repetitions of all RS resources of the RS resource set are configured to be transmitted is referred to as an "instance". Therefore, an "instance" of an RS resource set is a specified number of repetitions for each resource and a specified number of resources within the resource set such that once the specified number of repetitions are transmitted for each of the specified number of resources, the instance is complete. An instance may also be referred to as an "occasion."

Figure 12:
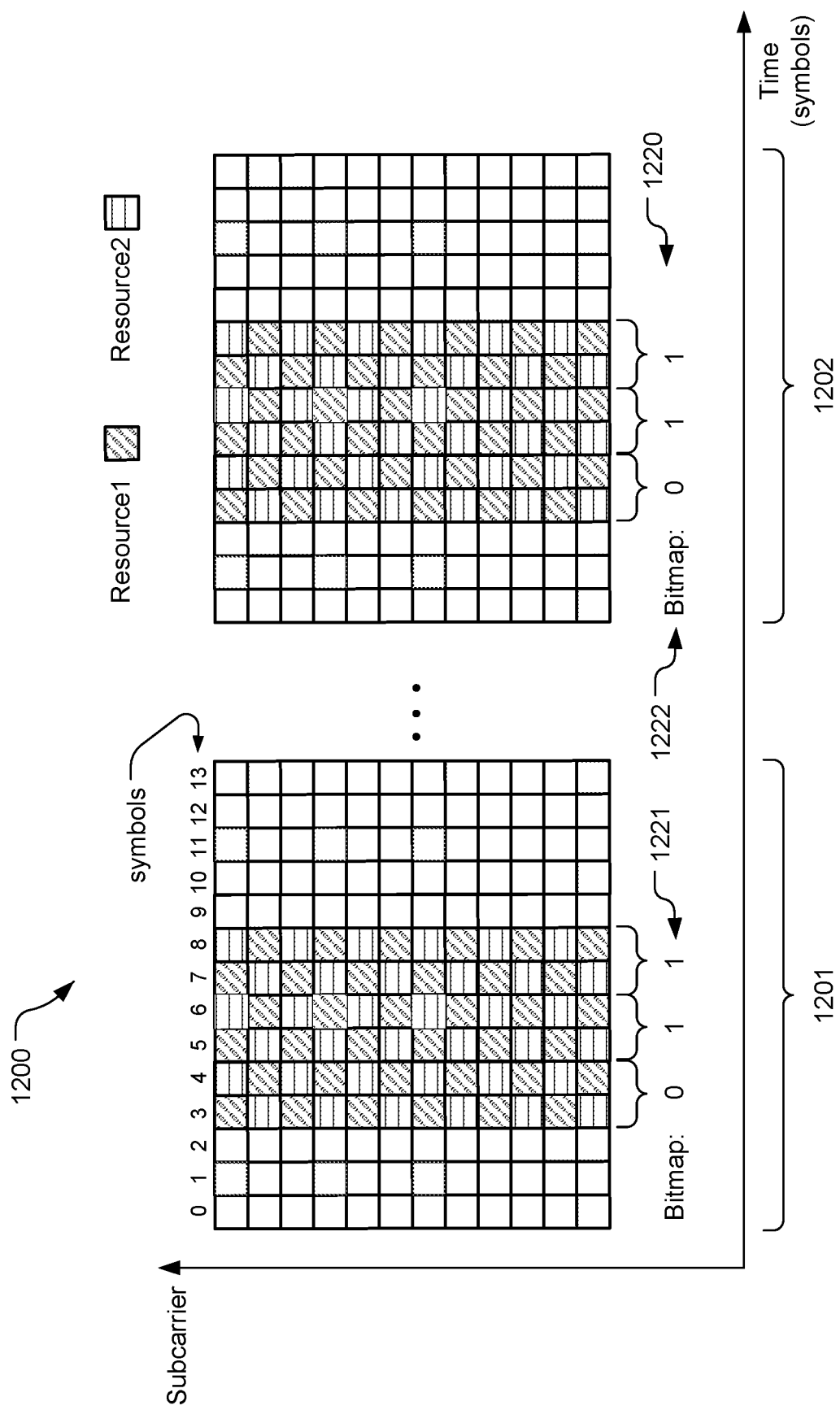
FIG. 12 is a timing diagram of intra-slot transmission and muting of a reference signal conveyed between components of a wireless communications system such as that shown in FIG. 1.

Traditionally, a signal muting configuration such as an RS muting configuration (also called an RS muting pattern) is a time schedule of when to mute a transmission schedule and when not to mute the transmission schedule. The transmission schedule is a time and subcarrier schedule (e.g., as shown in FIG. 12) of when and which resource elements are sounded (modulated with a signal) for conveying a signal such as a PRS or TRS. Different muting configurations may be applied, e.g., to different TRPs 300 to help improve orthogonality to reduce interference between the RS signals from neighboring TRPs 300. An RS muting configuration may be represented by a bitmap (i.e., a bit string) indicating when the RS is to be muted and when the RS is not to be muted, and thus the term bitmap and the term muting configuration are used interchangeably herein. For example, a bit value of "1" may indicate not to mute the corresponding RS signal(s) transmission and a bit value of "0" may indicate to mute the corresponding RS signal(s) transmission. The muting configuration may be inter-instance, in which case each bit in the bitmap indicates whether to mute all the RS repetitions of all RS resources in the corresponding configurable number of instances, or intra-instance, in which case each bit in the bitmap indicates whether to mute a corresponding RS repetition of all RS resources in an instance, or intra-slot, in which case each bit in the bitmap indicates whether to mute a corresponding symbol or set of symbols of one or more repetitions of one or more RS resources. Thus, for an example of inter-instance muting with bitmap of 1010, transmission of the $0^{th}$ and $2^{nd}$ instances is not muted, and transmission of the $1^{st}$ and $3^{rd}$ instances is muted. For the same bitmap of 1010 but with intra-instance muting, transmission of the $0^{th}$ and $2^{nd}$ repetitions within each instance is not muted, and transmission of the $1^{st}$ and $3^{rd}$ repetitions in each instance is muted. For the same bitmap of 1010 but with intra-slot muting, transmission of the $0^{th}$ and $2^{nd}$ symbols (or symbol groups) in a respective slot is not muted, and transmission of the $1^{st}$ and $3^{rd}$ symbols (or symbol groups) in a respective slot is muted. Further, different slots may have different intra-slot muting configurations.

Inter-Instance Muting Configuration

Figure 10:
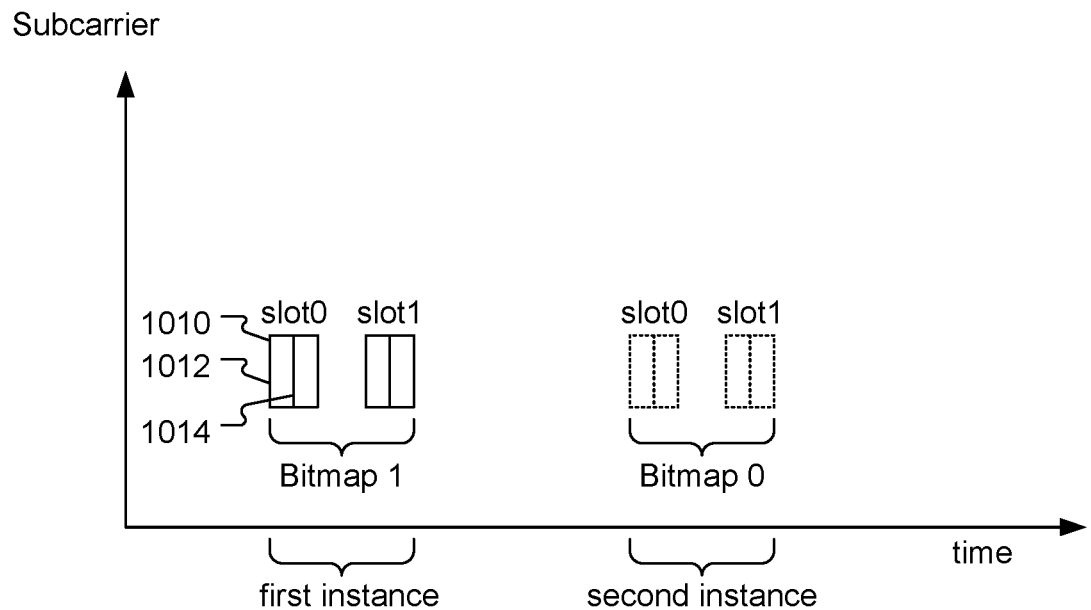
FIG. 10 is a timing diagram of inter-instance transmission and muting of reference signals conveyed between components of a wireless communications system such as that shown in FIG. 1.

Numerous muting configurations may be used in combination with various scenarios of repetition quantity, symbols per repetition, comb types, etc. Referring also to FIG. 10, an example of an inter-instance RS muting configuration for a scenario of comb-2 transmission, two symbols per repetition, two repetitions per instance, and with a 2-bit muting bitmap is shown, although the comb-2 detail is not shown. A quantity of instances, e.g., consecutive instances, may be configurable and, in this example, is one instance to help simplify the example. Comb-K indicates that in each symbol, the transmission scheduled is for each resource to transmit in every $K^{th}$ subcarrier. Some RS, e.g., PRS, may have each resource transmitted using different subcarriers in each symbol while other RS, e.g., TRS, may use the same subcarriers in each symbol in which the same resource transmits. Consequently, the different resources are frequency-division multiplexed to use different subcarriers to transmit RS such that the RS transmitted concurrently are frequency orthogonal to help prevent collisions between the RS. Further, the resources may switch subcarriers, called staggering, for different symbols within a repetition to help fill holes in the frequency domain to help eliminate aliases in the time domain. For example, a repetition 1010 comprising PRS includes a symbol 1012 and a symbol 1014. In the symbol 1012, a first resource may use odd-numbered subcarriers and a second resource may use even-numbered subcarriers. In the symbol 1014, the first resource may transmit using even-numbered subcarriers and the second resource may transmit using odd-numbered subcarriers. The two repetitions per instance in this example are transmitted in consecutive slots (slot0 and slot1) although this is not required.

The muting configuration shown in FIG. 10 comprises a 2-bit muting bitmap for each pair of instances. In this example, a value of "1" in the bitmap corresponds to transmitting the instance without muting and a value of "0" in the bitmap corresponds to muting the instance. Resources indicated to be muted are shown in dotted lines in FIG. 10 and resources indicated not to be muted are shown in solid lines. While only one instance is shown corresponding to each bit in each bitmap, more than one instance may correspond to a bit in a bitmap, with the quantity of instances corresponding to a bit being configurable. Thus, a bit in the bitmap may correspond to a configurable number of (consecutive) instances of a DL-PRS resource set in a periodic transmission of DL-PRS resource sets.

Intra-Instance Muting Configuration

Figure 11:
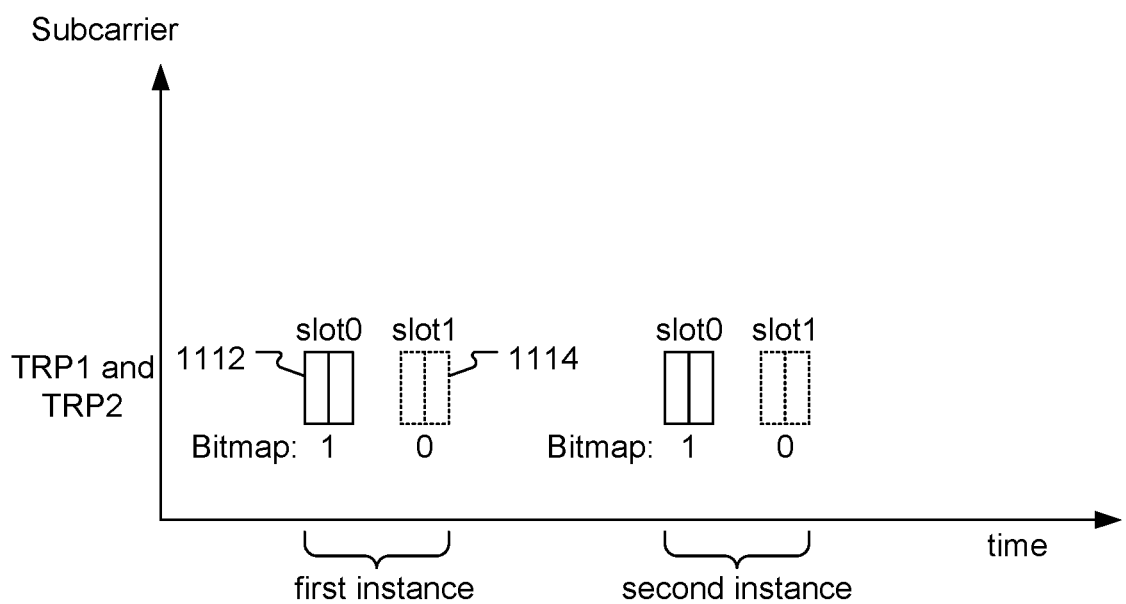
FIG. 11 is a timing diagram of intra-instance transmission and muting of reference signals conveyed between components of a wireless communications system such as that shown in FIG. 1.

Referring also to FIG. 11, an example of an intra-instance RS muting configuration for a scenario of comb-2 transmission, two symbols per repetition, two repetitions per instance, and with a 2-bit muting bitmap is shown, although the comb-2 detail is not shown. Each instance is given a 2-bit bitmap muting configuration, with each bit corresponding to a respective repetition in a respective instance. In this scenario, the bitmaps indicate not to mute resources during a first repetition 1112 during a first instance, and to mute transmission during a second repetition 1114 during the first instance. A similar bitmap is provided for the second instance.

The scenarios shown in FIGS. 10 and 11 are examples only and many other scenarios may be used. For example, bitmaps of other sizes may be used, e.g., 4 bits, 8 bits, 16 bits, 32 bits, etc. Thus, in an intra-instance scenario similar to FIG. 11, but with a bitmap of four bits, each bit may correspond to each of four repetitions in an instance. Numerous muting configurations of repetitions within an instance may be used.

Intra-Slot Muting Configuration

Referring also to FIG. 12, an example of intra-slot RS muting for a scenario of comb-2 transmission, six symbols per repetition, two repetitions per instance, and with a 3-bit muting bitmap is shown. FIG. 12 shows a transmission schedule 1200 for two slots, which may be a portion of a larger transmission schedule for transmitting signals such as a PRS. Here, the transmission schedule 1200 indicates three portions of two resources (Resource1 and Resource2) to be carried by symbols 3-8 of each of a first slot 1201 and a second slot 1202. A muting configuration 1220 is represented by bitmap portions 1221, 1222 for the slots 1201, 1202, respectively. Each bit of the bitmap representing the muting configuration 1220 corresponds to a respective segment of the respective slot 1201, 1202. In this example, the RS may be a PRS, here with each segment being equal in size and corresponding to an intra-slot group of symbols, with each group indicating to sound all resource elements of the transmission schedule over a respective set of symbols. Different intra-slot groups may be the same (i.e., intra-slot repetitions with identical patterns of sounded resource elements) or different (i.e., have different resource element patterns over the symbols used, even if they sound all the same subcarriers). In this example, a quantity G of intra-slot groups is equal to N/K, where N is the length of the RS resource in number of symbols in a slot (here, six symbols) and K is the comb type (i.e., comb number), and a quantity M of slot segments equals G (M=G). Thus, as shown, with an RS resource length (i.e., the length of the resource in symbols) of six symbols and a comb type of 2, there are three intra-slot groups (G=3) of two symbols each, and three bits per bitmap portion (M=3), one bit for each intra-slot group, i.e., each segment corresponding to a bit in the bitmap also corresponds to one intra-slot group in this example. The muting configuration 1220 is an example, both in terms of mapping of bits to symbols and in a pattern of bits shown, and other examples may be used. For example, a muting configuration may have each slot segment corresponding to a single symbol (instead of an intra-slot group of symbols as with the muting configuration 1220). As another example, a muting configuration may vary over different slots and/or resources.

Tracking Reference Signals

Figure 13:
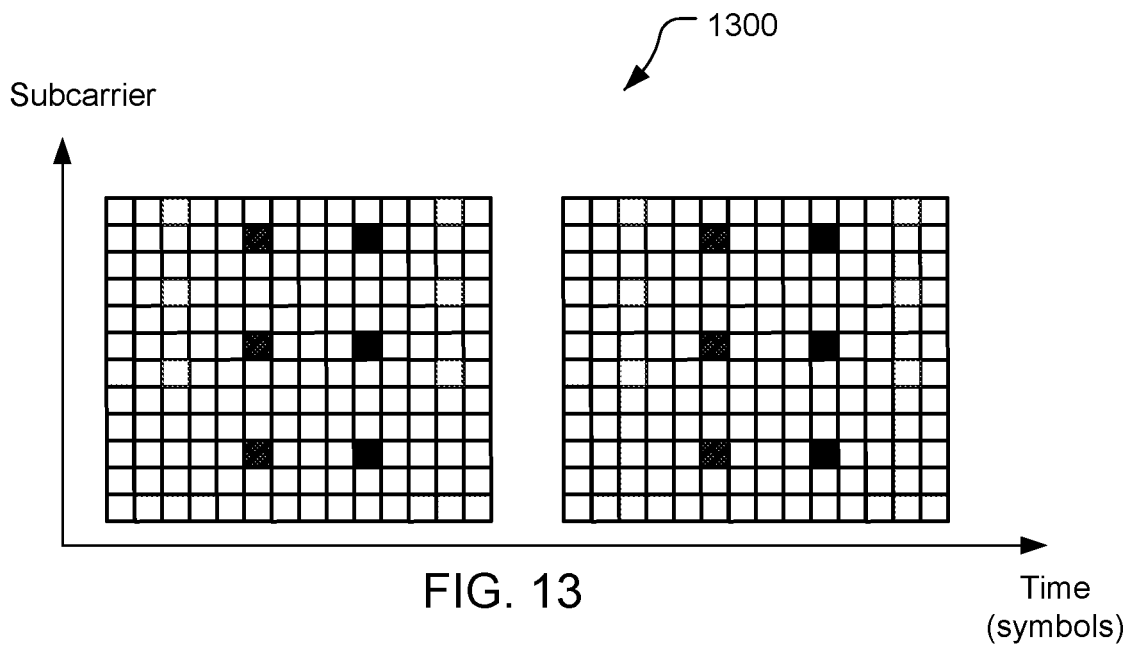
FIG. 13 is a simplified diagram of a transmission schedule of an example tracking reference signal.

Referring to FIG. 13 with further reference to FIG. 8, in addition to PRS, another type of RS is a Tracking Reference Signal (TRS). TRS are DL RS that enable the UE to track time and frequency variations with high resolution. TRS are wide-band and transmitted in regular bursts (at regular intervals). Parameters for a TRS burst structure include X, the TRS burst length in number of slots, and Y, the TRS burst periodicity in number of slots. For example, the burst length X for sub-6 GHz may be two slots and for above 6 GHz may be one or two slots, the burst periodicity Y for sub-6 GHz and above 6 GHz may be 10, 20, 40, or 80 ms, and a number (N) of OFDM symbols for TRS within a slot for sub-6 GHz and above 6 GHz may be two symbols. A TRS bandwidth, B, may be about 50 resource blocks (RBs) for periodicities of 20 ms and above, and may be 50 RBs for 10 ms periodicity. A TRS subcarrier spacing ($S_f$) may be four REs and a TRS symbol spacing ($S_t$) within a slot may be four symbols. The UE 800 is not expected to receive TRS outside of the bandwidth part (BWP) for TRS and a TRS RB position is configured by the TRP 300. TRS is configured as a CSI-RS resource set with common values of the NZP (non-zero power) CSI-RS resources in the CSI-RS resource set configured to reduce signaling overhead. TRS supports a single port, can be configured as multiple TRS for multi-TRP/multi-panel transmission, has an equal RE (resource element) spacing in the frequency domain within the TRS bandwidth and is UE-specifically managed. As shown in FIG. 13, for a TRS instance 1300, the burst length X is two slots, the number N of symbols within a slot is two, the subcarrier spacing $S_f$ is four, and the symbol spacing $S_t$ within a slot is four. TRS has not been subject to muting. The TRS is reliably transmitted for use by the UE 800 to determine time and frequency variations.

Figure 14:
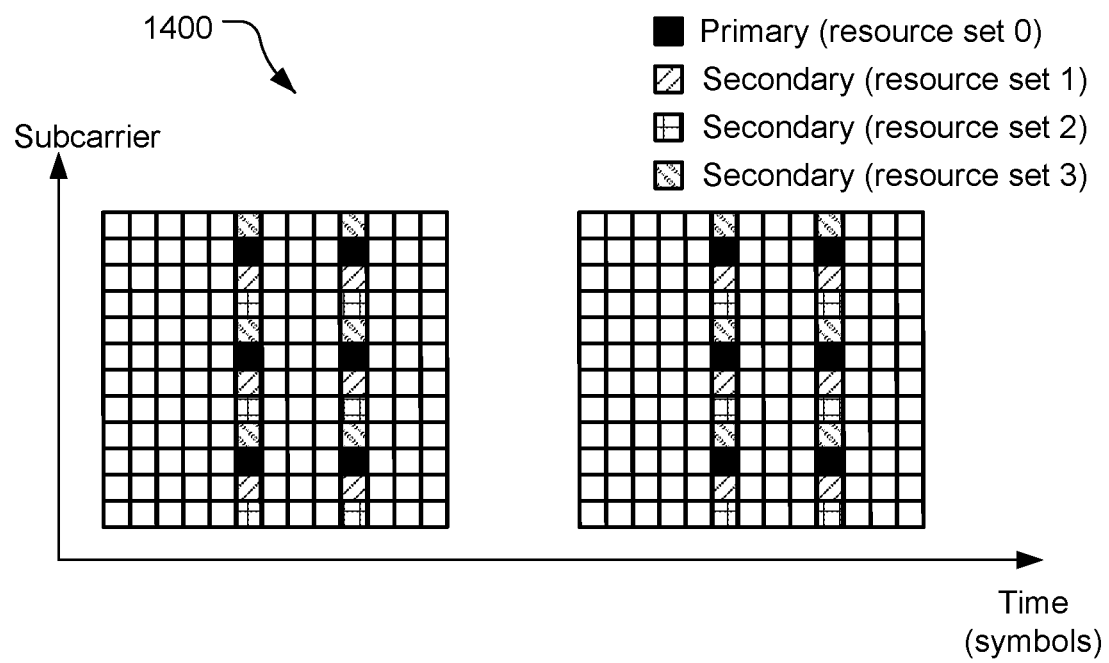
FIG. 14 is a simplified diagram of a transmission schedule of an example extended tracking reference signal.

Referring also to FIG. 14, an extended TRS (E-TRS) 1400 includes a primary resource set, of a reference signal resource, and multiple secondary resource sets, of reference signal resources. The E-TRS 1400 includes four different resource sets. An E-TRS includes a collection of multiple resource sets, with each resource set occupying an identical set of REs in each symbol, and with at least one symbol between occupied symbols. The E-TRS 1400 may be used for positioning by associating the TRP of the E-TRS 1400 with a location. The primary resource set of the E-TRS 1400 may be used for frequency and time tracking and a primary resource set ID will be provided to the UE 800 to identify the primary resource set of the resource sets constituting the E-TRS 1400. The primary resource set should not be muted such that legacy UEs, that expect reception of the TRS resource set, will receive the TRS resource set for time and frequency tracking.

Selective Resource Muting

Muting has traditionally been a time schedule of when to mute a transmission schedule and when not to mute the transmission schedule. As discussed herein, muting may be provided for one or more resources in a time period (e.g., one or more symbols, one or more slots, or one or more instances) while not muting one or more other resources in the same time period. As discussed herein, one or more resources may be muted in a time period without muting one or more other resources in the same time period. Thus, for example, one or more secondary resource sets of an E-TRS may be muted while not muting the primary resource set. In this way, a UE that expects uninterrupted transmission of the primary resource set will be able to receive the primary resource set despite a muting pattern indicating to mute. The UE may use the primary resource set for time and/or frequency tracking to help avoid reduced performance of time and/or frequency tracking.

Referring again to FIG. 9, with further reference to FIGS. 1-4, 8, and 10-18, the RS muting unit 960 may be configured to determine RS muting as part of an RS configuration and may be configured to instruct the TRP 300 to provide RS in accordance with the RS configuration. The RS muting unit 960 may be configured to provide a resource-specific muting configuration, e.g., a resource-specific muting pattern, as part of RS configuration parameters provided to the TRP 300 for the TRP 300 to use to determine an RS configuration including an RS schedule and RS muting pattern. The resource-specific muting pattern may correspond to (e.g., indicate to have) one or more resources of an RS (e.g., the primary resource set of an E-TRS, or one or more resources of a multi-resource PRS, etc.) being muted and concurrently one or more resources of the RS being transmitted, unmuted.

Figure 18:
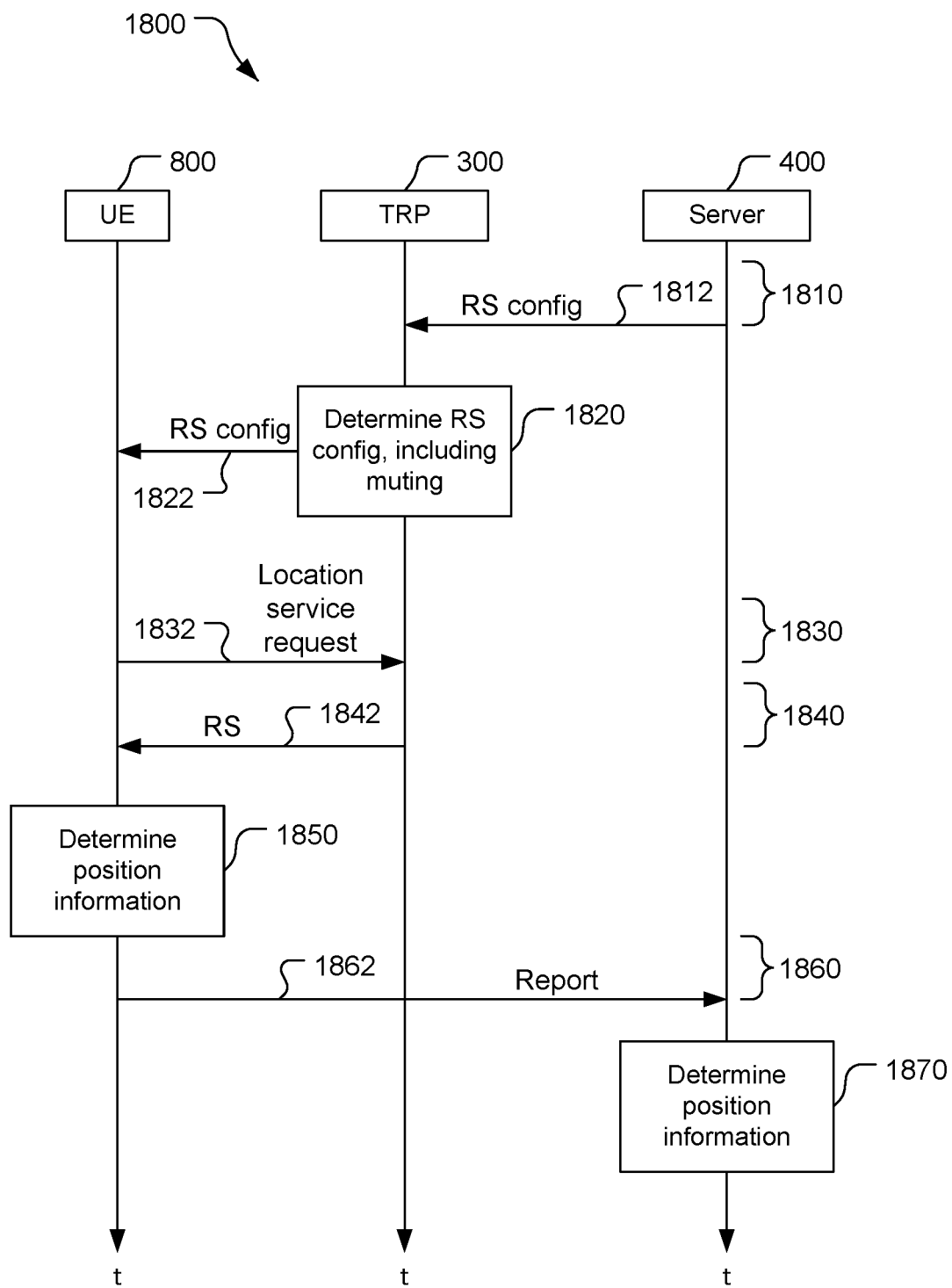
FIG. 18 is a simplified diagram of a signaling and process flow using time-based and resource-based muting for position information determination.

A processing and signal flow 1800 shown in FIG. 18 includes the stages shown. The flow 1800 is an example only, and other flows are possible, e.g., with stages added, removed, and/or rearranged compared to the flow 1800.

At stage 1810, the server 400, e.g., the RS muting unit 960, provides an RS configuration message 1812 to the TRP 300. The RS configuration message 1812 may include one or more RS configuration parameters and may be configured to cause the TRP 300 to implement an RS configuration to send one or more RS in accordance with the RS configuration. The RS configuration parameter(s) may include one or more time-based muting patterns and/or an indication of resource-based muting. The RS configuration message 1812 may not include an indication of resource-based muting, e.g., if the TRP 300 is configured with a default (e.g., a manufacturer-programmed) resource-based muting. Resource-based muting may be implicit, with no explicit indication of resource-based muting provided.

At stage 1820, the TRP 300 determines one or more RS configurations for one or more RS, including one or more RS muting configurations, and sends an RS configuration message 1822 to the UE 800 indicating the determined RS configuration(s) (including muting configuration(s)). The TRP 300 may be configured with a default resource-based muting, in which case the TRP 300 may determine an RS muting configuration to include resource-based muting without having received an explicit indication to implement resource-based muting. The TRP 300 may be configured to override a default resource-based muting with any explicit resource-based muting indicated by the RS configuration message 1812, or to use the default resource-based muting regardless of any explicit resource-based muting indicated by the RS configuration message 1812. The TRP 300 (e.g., the RS muting unit 960 with the network entity 900 including or being a TRP) may be configured to use an explicit indication of resource-based muting in the RS configuration message 1812 to determine resource-based muting of one or more RS to be transmitted from the TRP 300.

The indication of resource-based muting may be provided by the RS muting unit 960 in the RS configuration message 1812 in any of a variety of formats, e.g., depending on a configuration of the TRP 300. For example, the indication may be a single bit indicating whether or not to mute resources in accordance with a time-based muting pattern, i.e., whether to apply a time-based muting pattern indication to mute one or more resources. The single bit may correspond to one or more resources, e.g., as statically programmed (e.g., hardcoded into the memory 311 during manufacture) or dynamically programmed (e.g., through one or more control signals received via the transceiver 315). As another example, multiple bits may be used to form a code, with different values of the code corresponding to different sets of resources, with each set comprising one or more resources. As another example, multiple bits may be provided, with each bit corresponding to a respective resource and indicating whether to mute or not mute, or whether to apply a time-based muting pattern indicating to mute, the corresponding resource.

Figure 15:
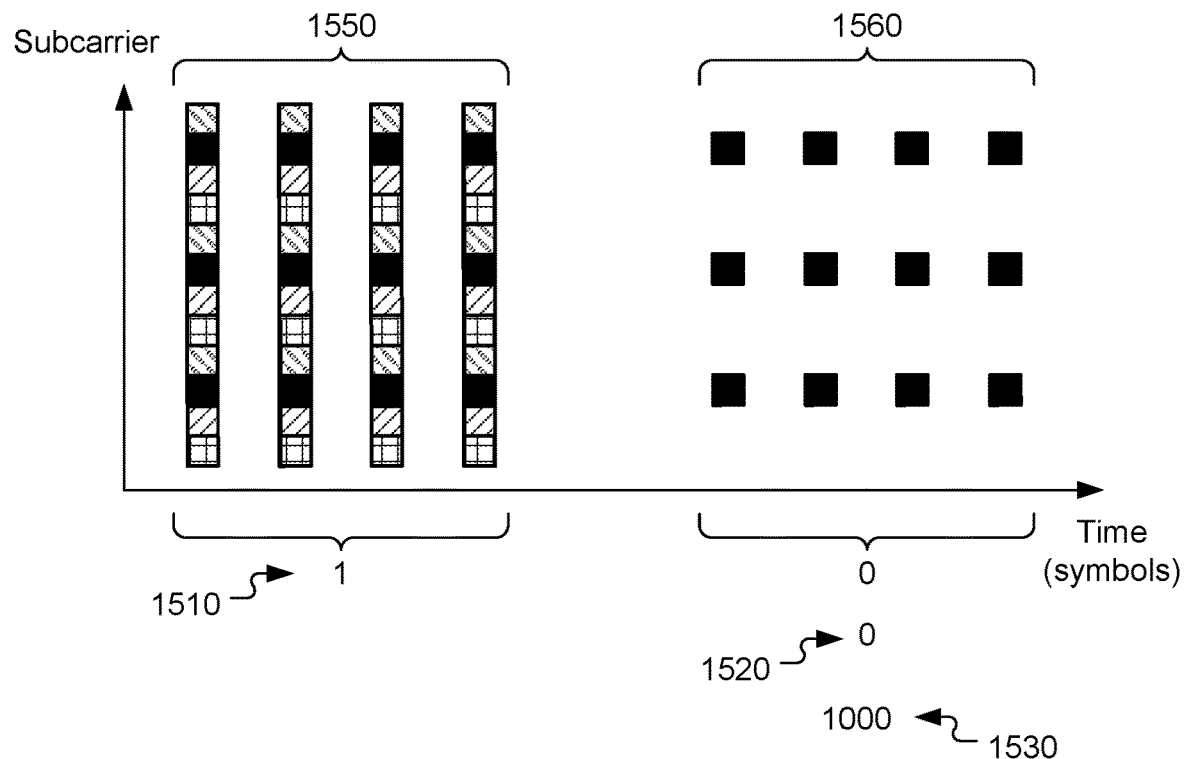
FIG. 15 is a simplified diagram of a transmission schedule of the example extended tracking reference signal shown in FIG. 14 with inter-instance muting and resource-based muting.

FIG. 15 shows examples of resource-based muting for multiple resource-based muting indications or implicit resource-based muting, for inter-instance time-based muting. As shown, a time-based, inter-instance muting pattern represented by a bitmap 1510 indicates to transmit, unmuted a first instance 1550 of an E-TRS and to mute a second instance 1560 of the E-TRS, (with only transmitted resource elements shown in FIGS. 15-18 in order to simplify the figures). In this example, all of the secondary resources are muted in the second instance 1560 and the primary resource is transmitted, unmuted in the second instance 1560 despite the time-based muting pattern indicating to mute the second instance 1560. The RS configuration message 1812 may include no indication of resource-based muting, and the TRP 300 may mute the secondary resources based on a static or dynamic configuration of the TRP 300 to mute all resources except the primary resource in response to a time-based muting pattern indicating to mute. That is, the TRP 300 may be configured to transmit, unmuted the primary resource always, regardless of an indication to mute. As another example, the RS configuration message 1812 may include a single-bit (or multi-bit) indication to implement resource-based muting that the TRP 300 is configured to interpret to determine which resource(s) to mute. In this example, a single-bit indication 1520 has a value of "0", indicating to apply the time-based muting to one or more corresponding resources. In this example, the TRP 300 is configured (statically or dynamically) to mute all secondary resources in response to a single-bit resource-based muting indication indicating to mute, and thus the TRP 300 will mute all of the secondary resources. As another example, a multi-bit indication 1530 has four bits each associated with one of the four resource sets. As shown, a value of "1000" indicates to transmit (i.e., ignore the time-based muting indication to mute) resource set 0, and to mute (i.e., apply the time-based muting indication to mute) resource sets 1, 2, 3. A multi-bit indication may include only bits corresponding to the secondary resource sets if the TRP 300 is configured to transmit the primary resource set always. The server 400 may send the single-bit indication 1520 or the multi-bit indication 1530 (or another indication) to cause the TRP 300 to implement the corresponding muting configurations to cause the TRP 300 to transmit (unmuted) or mute corresponding resources. The TRP 300 may apply the resource-based muting indication only to time-based muting pattern indications to mute the corresponding time period. Alternatively, the resource-based indication may have a value of "1" or all 1's for a time-based muting pattern indication to transmit (i.e., not mute) the corresponding time period.

Figure 16:
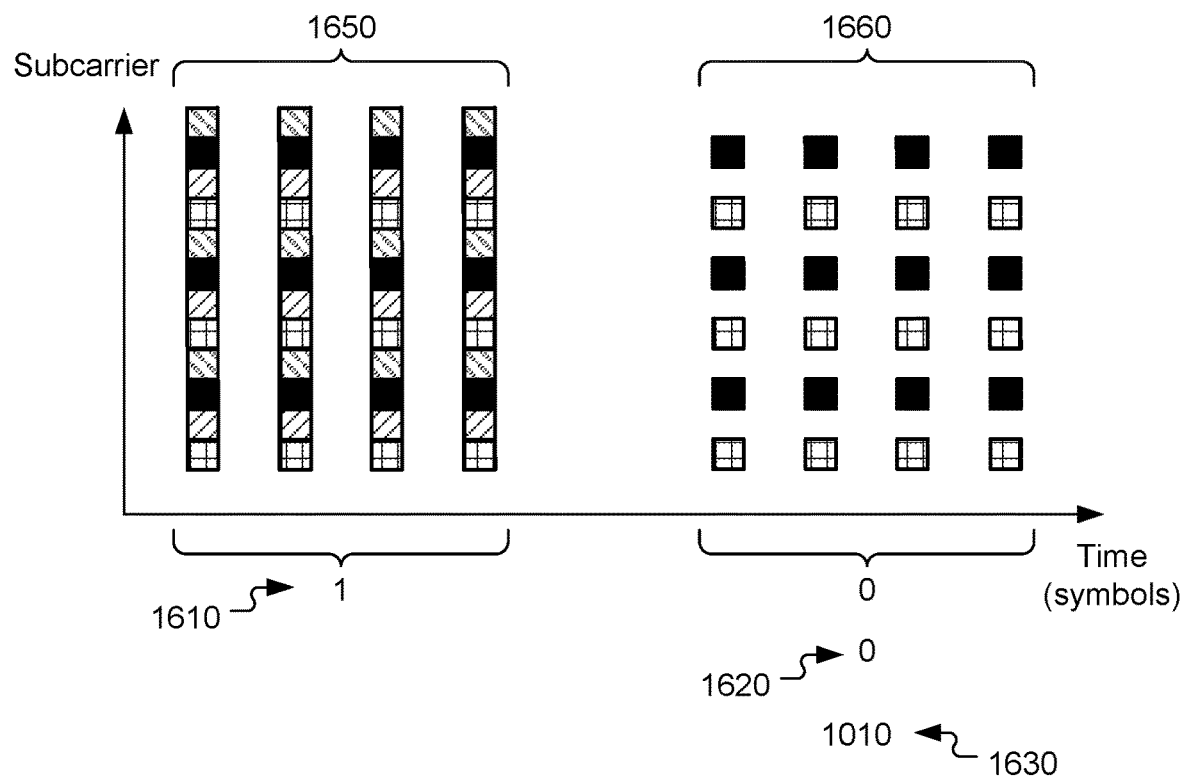
FIG. 16 is a simplified diagram of another transmission schedule of the example extended tracking reference signal shown in FIG. 14 with the same inter-instance muting as FIG. 15 but different resource-based muting than FIG. 15.

FIG. 16 shows other examples of resource-based muting for multiple resource-based muting indications or implicit resource-based muting, for inter-instance time-based muting. As shown, a bitmap 1610 is the same as the bitmap 1510 representing a time-based muting pattern to transmit, unmuted a first instance 1650 and to mute a second instance 1660. In this example, however, the TRP 300 is configured (statically or dynamically) to interpret a single-bit indication 1620 of resource-based muting having a value of "0" to correspond to muting secondary resource set 1 and secondary resource set 3, and to transmit secondary resource set 2 despite the time-based muting pattern indicating to mute the second instance. The TRP 300 may also be configured to interpret the value of "0" of the single-bit indication 1620 to indicate not to mute the primary resource set, and/or the TRP 300 may be configured never to mute the primary resource set (and thus may not interpret any meaning of the single-bit indication 1620 for the primary resource set). A multi-bit indication 1630 has four bits each associated with one of the four resource sets. As shown, a value of "1010" indicates to transmit (i.e., ignore the time-based muting indication to mute) resource sets 0, 2 and to mute (i.e., apply the time-based muting indication to mute) resources of the resource sets 1, 3. The server 400 may send the single-bit indication 1620 or the multi-bit indication 1630 (or another indication) to cause the TRP 300 to implement the corresponding muting configurations to cause the TRP 300 to transmit (unmuted) or mute corresponding resources. Although not shown, an indication may be provided for intra-symbol muting such that one or more REs within a symbol for a particular resource set may be muted while one or more other REs for that resource set are not muted. For example, for a slot indicated to be muted, less than all of the REs for a resource set may be indicated not to have the muting pattern applied while the remaining REs for that resource set will have the muting pattern applied.

The muting examples of FIGS. 15 and 16 are not limiting of the disclosure. For example, resource-based muting patterns may be applied to other time-based muting patterns, e.g., time-based muting patterns for other time periods such as intra-instance muting, intra-slot muting, etc.

Figure 17:
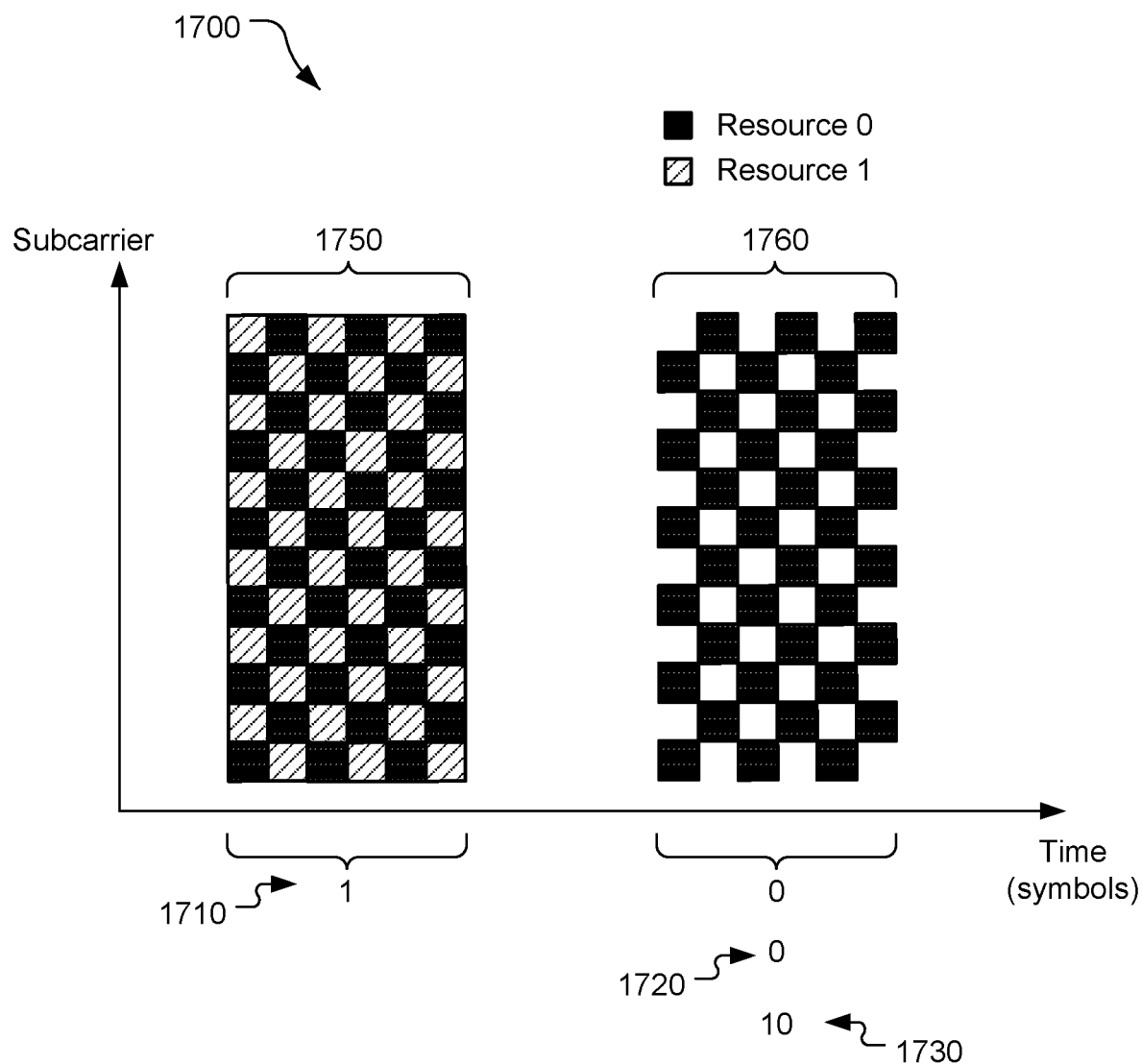
FIG. 17 is a simplified diagram of a transmission schedule of an example positioning reference signal shown in FIG. 14 with inter-instance muting and resource-based muting.

As another example, as shown in FIG. 17, resource-based muting may be applied to RS other than E-TRS, such as to PRS. In this example, time-based muting is inter-instance muting, and a bitmap 1710 has a value of "10" indicating to transmit, unmuted a first instance 1750 and to mute a second instance 1760. In this example, a PRS 1700 has two resources (resource 0 and resource 1) with a repetition factor of three. A single-bit indication 1720 of resource-based muting indicates to mute (e.g., apply the time-based muting to) a corresponding resource, in this example, to mute resource 1 per a (static or dynamic) configuration of the TRP 300. If the PRS had more than two resources, the single-bit indication 1720 may correspond to more than one resource. A multi-bit indication 1730 includes two bits, in this example, with each bit corresponding to a resource, and the value of each bit indicating whether to mute (apply the time-based muting to) a corresponding resource. As for the TRS, the TRP 300 may be configured with a default resource-based configuration for PRS (and/or other RS), e.g., never to mute resource 0, in which case the single-bit indication 1720 or the multi-bit indication 1730 (or other indication) may be omitted from the RS configuration message 1812.

Remaining stages of the flow 1800 provide position information based on the RS configuration indicated and determined at stages 1810, 1820. At stage 1830, the UE 800 sends a location service request 1832 to the TRP 300 (and/or to the server 400) requesting location service. At stage 1840, the TRP 300 sends RS 1842 for positioning (e.g., PRS, E-TRS) to the UE 800. At stage 1850, the UE 800 measures the RS 1842 to determine position information (e.g., one or more measurements, one or more pseudoranges, one or more position estimates, etc.). At stage 1860, the UE 800 sends a report 1862 to the server 400 with position information (e.g., one or more measurements, one or more pseudoranges, one or more position estimates, etc.). At stage 1870, the server 400 determines position information (e.g., a position estimate of the UE 800 based on information in the report 1862).

Operation

Referring to FIG. 19, with further reference to FIGS. 1-18, a method 1900 of resource-based muting includes the stages shown. The method 1900 is, however, an example only and not limiting. The method 1900 may be altered, e.g., by having stages added, removed, rearranged, combined, performed concurrently, and/or having single stages split into multiple stages.

At stage 1910, the method 1900 includes instructing a transmission point (TP) to apply a muting pattern regarding transmission of a reference signal comprising a first reference signal resource and a second reference signal resource, wherein a first instance of the first reference signal resource comprises one or more first resource elements across one or more first orthogonal frequency division multiplex (OFDM) symbols within a slot, and a second instance of the second reference signal resource comprises one or more second resource elements across one or more second OFDM symbols within the slot. The transmission point may be a dedicated device for transmission (e.g., a TRP without reception components such as processor component(s) for signal reception), or may be a TRP or a transmission portion of a TRP, or other device. For example, the server 400 may send the RS configuration message 1812 to the TRP 300 to indicate a muting pattern, e.g., a time-based muting pattern regarding a reference signal. The RS configuration message 1812 may include other configuration information for the RS to be sent by the TRP 300, with the configuration including a muting pattern. The muting pattern may indicate time portions (e.g., instances, slots, slot segments) to transmit unmuted or to mute. The second OFDM symbol(s) may be the first OFDM symbol(s), or may be separate from the first OFDM symbol(s), or one or more of the second OFDM symbols may be one or more of the first OFDM symbol(s) and one or more other of the second OFDM symbols may be separate from the first OFDM symbol(s). The processor 910 (e.g., the processor 410), possibly in combination with the memory 930 (e.g., the memory 411), in combination with the interface 920 (e.g., the transceiver 415, e.g., the wired transmitter 452) may comprise means for instructing a TRP to apply a muting pattern. Alternatively, the processor 310 of the TRP 300 may cause the TRP 300 to apply the muting pattern and thus the processor 310, possibly in combination with the memory 311, may comprise means for instructing a TRP to apply the muting pattern.

At stage 1920, the method 1900 includes instructing the TP to transmit, unmuted, at least one of the one or more second resource elements, of at least one of the one or more second OFDM symbols, despite the muting pattern indicating to mute transmission of the at least one of the one or more second resource elements of the at least one of the one or more second OFDM symbols. For example, for multi-symbol resources, one resource may be muted across multiple symbols and another resource may be transmitted in one or more of those same symbols. As another example, with respective time-based muting patterns indicating to mute, resource set 0 of the second instance 1560 shown in FIG. 15, or resource set 0 and resource set 2 of the second instance 1660 shown in FIG. 16, or resource 0 of the second instance 1760 shown in FIG. 17, may be transmitted unmuted while transmission of resource sets 1, 2, 3 in the second instance 1560 are muted, resource sets 1, 3 in the second instance 1660 are muted, and resource 1 in the second instance 1760 is muted. As another example, one or more resource elements of a reference signal resource (e.g., resource set 1, resource set 2, resource set 3) within one or more symbols may be muted while one or more other resource elements of the reference signal resource are transmitted unmuted. As another example, the instructing may comprise transmitting an indication from a server to the TP to transmit, unmuted, the at least one of the one or more second resource elements. For example, to instruct the TP to transmit, unmuted, at least one of the one or more second resource elements, the server 400 may, for example, transmit the RS configuration message 1812 to the TRP 300 to indicate a resource-based muting, e.g., with the RS configuration message 1812 (which may include multiple separate messages) including an indication of one or more resource elements (e.g., of one or more reference signal resources) not to be muted in accordance with the muting pattern. The indication of resource-based muting may be, for example, a single-bit indication or a multi-bit indication as discussed with respect to FIGS. 15-17, e.g., with each bit of the multi-bit indication corresponding to (and indicating whether to mute) a respective second reference signal resource. Another bit string may be provided to indicate whether to mute or transmit, unmuted, resource elements within a symbol. As another example, the server 400 may implicitly cause the TP, e.g., the TRP 300, to transmit the second resource element(s) unmuted by indicating an RS to be transmitted and the muting pattern, with the TP being configured to transmit one more resources unmuted by default (e.g., always). The processor 910 (e.g., the processor 410), possibly in combination with the memory 930 (e.g., the memory 411), in combination with the interface 920 (e.g., the transceiver 415, e.g., the wired transmitter 452) may comprise means for instructing a TRP to transmit, unmuted at least one of the one or more second resource elements. Alternatively, the processor 310 of the TRP 300 may instruct the TRP 300 to transmit, unmuted, at least one of the one or more second resource elements, e.g., based on an indication from the server 400, or based on a static configuration of the TRP 300 (e.g., hardcoding during manufacture), or based on a dynamic configuration of the TRP 300 (e.g., a control message received by the TRP 300). The processor 310, possibly in combination with the memory 311, in combination with the transceiver 315 (e.g., the wireless receiver 344 and the antenna 346 and/or the wired receiver 354) may comprise means for instructing a TRP to transmit, unmuted at least one of the one or more second resource elements.

Implementations of the method 1900 may include one or more of the following features. In an example implementation, the reference signal comprises multiple reference signal instance sets with each of the multiple reference signal instance sets comprising the first instance and the second instance, and instructing the TP to transmit, unmuted, at least one of the one or more second resource elements comprises instructing the TP to transmit, unmuted, all of the one or more second resource elements in each of the multiple reference signal instance sets regardless of the muting pattern. For example, the primary resource set shown in FIGS. 15 and 16 may always be transmitted without muting, e.g., to accommodate legacy UEs that expect the primary resource not to be muted, and thus to avoid impeding positioning using a legacy UE while improving orthogonality of the reference signal. In a further example implementation, the second reference signal resource may consist of an identical frequency-domain unstaggered plurality of the one or more second resource elements in each of the multiple instance sets. The second resource(s) may each be, for example, a TRS resource that uses the same REs in each symbol.

Also or alternatively, implementations of the method 1900 may include one or more of the following features. In an example implementation, the method 1900 may include instructing the TP to transmit, to a user equipment, a first indication of the muting pattern and a second indication that the at least one of the one or more second resource elements will be transmitted, unmuted, despite the muting pattern indicating to mute transmission of the at least one of the one or more second resource elements of the at least one of the one or more second OFDM symbols. For example, the server 400 may instruct, explicitly or implicitly (e.g., by providing the RS configuration message 1812) the TRP 300 to send the RS configuration message 1822 to the UE 800 to indicate a time-based muting pattern and a resource-based muting configuration that indicates to transmit, unmuted, the second reference signal resource (e.g., all resource elements of the second reference signal resource) even when the time-based muting configuration indicates to mute the second reference signal resource. The processor 910 (e.g., the processor 410), possibly in combination with the memory 930 (e.g., the memory 411), in combination with the interface 920 (e.g., the transceiver 415, e.g., the wired transmitter 452) may comprise means for instructing the TRP to send, to a UE, the first indication and the second indication. Alternatively, the processor 310 of the TRP 300 may instruct the TRP 300 to transmit, unmuted, at least one of the one or more second resource elements, e.g., in response to receiving the RS configuration parameters from the server 400. The processor 310, possibly in combination with the memory 311, in combination with the transceiver 315 (e.g., the wireless receiver 344 and the antenna 346 and/or the wired receiver 354) may comprise means for instructing the TRP to send, to a UE, the first indication and the second indication.

Also or alternatively, implementations of the method 1900 may include one or more of the following features. In an example implementation, the reference signal may be a tracking reference signal, and each of the first reference signal resource and the second reference signal resource corresponds to a single CSI-RS (Channel State Information—Reference Signal) resource. In another example implementation, the reference signal is an extended tracking reference signal, and the first reference signal resource corresponds to a first CSI-RS resource set and the second reference signal resource corresponds to a second CSI-RS resource set. In another example implementation, the method 1900 includes instructing the TP to mute transmission of the first reference signal resource of the at least one of the one or more first OFDM symbols in accordance with the muting pattern. For example, the server 400 may instruct the TRP 300 to mute transmission of one or more reference signal resources in accordance with a time-based muting pattern indicating to mute one or more symbols even though one or more other resources in the symbol(s) are transmitted in spite of (contrary to) the time-based muting pattern. The server 400 may include an indication in the RS configuration message 1812 to apply the muting pattern to one or more reference signal resources, e.g., implicitly by a single-bit (or coded multi-bit) indication and programming of the TRP 300, or explicitly by a multi-bit indication with one or more of the bits indicating to apply the indicated muting of the muting pattern to one or more respective reference signal resources. The processor 910 (e.g., the processor 410), possibly in combination with the memory 930 (e.g., the memory 411), in combination with the interface 920 (e.g., the transceiver 415, e.g., the wired transmitter 452) may comprise means for instructing the TRP to mute transmission of the first reference signal resource of the at least one of the one or more second OFDM symbols in accordance with the muting pattern. Alternatively, the processor 310 of the TRP 300 may instruct the TRP 300 to mute transmission of one or more reference signal resources in accordance with a time-based muting pattern indicating to mute one or more symbols even though one or more other resources in the symbol(s) are transmitted in spite of (contrary to) the time-based muting pattern. The processor 310, possibly in combination with the memory 311, may comprise means for instructing the TRP to mute transmission of the first reference signal resource of the at least one of the one or more second OFDM symbols in accordance with the muting pattern.

IMPLEMENTATION EXAMPLES

Implementation examples are provided in the following numbered clauses.

1. A network entity comprising:
a transmitter;
a memory; and
a processor communicatively coupled to the transmitter and the memory and configured to:
instruct a transmission point to apply a muting pattern regarding transmission of a reference signal comprising a first reference signal resource and a second reference signal resource, wherein a first instance of the first reference signal resource comprises one or more first resource elements across one or more first orthogonal frequency division multiplex symbols within a slot, and a second instance of the second reference signal resource comprises one or more second resource elements across one or more second orthogonal frequency division multiplex symbols within the slot; and
instruct the transmission point to transmit, unmuted, at least one of the one or more second resource elements, of at least one of the one or more second orthogonal frequency division multiplex symbols, despite the muting pattern indicating to mute transmission of the at least one of the one or more second resource elements of the at least one of the one or more second orthogonal frequency division multiplex symbols.

2. The network entity of clause 1, wherein the reference signal comprises multiple reference signal instance sets with each of the multiple reference signal instance sets comprising the first instance and the second instance, and wherein the processor is configured to instruct the transmission point to transmit, unmuted, all of the one or more second resource elements in each of the multiple reference signal instance sets regardless of the muting pattern.

3. The network entity of clause 2, wherein the second reference signal resource consists of an identical frequency-domain unstaggered plurality of the one or more second resource elements in each of the multiple reference signal instance sets.

4. The network entity of clause 1, wherein the processor is configured to transmit, via the transmitter to the transmission point, an indication to transmit, unmuted, the at least one of the one or more second resource elements.

5. The network entity of clause 4, wherein the indication consists of a single bit.

6. The network entity of clause 4, wherein the second reference signal resource comprises one or more second reference signal resources, and wherein the indication comprises one or more bits, each of the one or more bits corresponding to a respective one of the one or more second reference signal resources.

7. The network entity of clause 1, wherein the processor is configured to instruct the transmission point to transmit, to a user equipment, a first indication of the muting pattern and a second indication that the at least one of the one or more second resource elements will be transmitted, unmuted, despite the muting pattern indicating to mute transmission of the at least one of the one or more second resource elements of the at least one of the one or more second orthogonal frequency division multiplex symbols.

8. The network entity of clause 1, wherein the reference signal is a tracking reference signal, and wherein each of the first reference signal resource and the second reference signal resource corresponds to a single Channel State Information—Reference Signal resource.

9. The network entity of clause 8, wherein the reference signal is an extended tracking reference signal, and wherein the first reference signal resource corresponds to a first Channel State Information—Reference Signal resource set and the second reference signal resource corresponds to a second Channel State Information—Reference Signal resource set.

10. The network entity of clause 1, wherein the processor is configured to instruct the transmission point to mute transmission of the first reference signal resource of the at least one of the one or more first orthogonal frequency division multiplex symbols in accordance with the muting pattern.

11. A method of managing positioning reference signal transmission, the method comprising:

instructing a transmission point to apply a muting pattern regarding transmission of a reference signal comprising a first reference signal resource and a second reference signal resource, wherein a first instance of the first reference signal resource comprises one or more first resource elements across one or more first orthogonal frequency division multiplex symbols within a slot, and a second instance of the second reference signal resource comprises one or more second resource elements across one or more second orthogonal frequency division multiplex symbols within the slot; and instructing the transmission point to transmit, unmuted, at least one of the one or more second resource elements, of at least one of the one or more second orthogonal frequency division multiplex symbols, despite the muting pattern indicating to mute transmission of the at least one of the one or more second resource elements of the at least one of the one or more second orthogonal frequency division multiplex symbols.

12. The method of clause 11, wherein the reference signal comprises multiple reference signal instance sets with each of the multiple reference signal instance sets comprising the first instance and the second instance, and wherein instructing the transmission point to transmit, unmuted, at least one of the one or more second resource elements comprises instructing the transmission point to transmit, unmuted, all of the one or more second resource elements in each of the multiple reference signal instance sets regardless of the muting pattern.

13. The method of clause 12, wherein the second reference signal resource consists of an identical frequency-domain unstaggered plurality of the one or more second resource elements in each of the multiple reference signal instance sets.

14. The method of clause 11, wherein instructing the transmission point to transmit, unmuted, at least one of the one or more second resource elements comprises transmitting an indication from a server to the transmission point to transmit, unmuted, the at least one of the one or more second resource elements.

15. The method of clause 14, wherein the indication consists of a single bit.

16. The method of clause 14, wherein the second reference signal resource comprises one or more second reference signal resources, and wherein the indication comprises one or more bits, each of the one or more bits corresponding to a respective one of the one or more second reference signal resources.

17. The method of clause 11, further comprising instructing the transmission point to transmit, to a user equipment, a first indication of the muting pattern and a second indication that the at least one of the one or more second resource elements will be transmitted, unmuted, despite the muting pattern indicating to mute transmission of the at least one of the one or more second resource elements of the at least one of the one or more second orthogonal frequency division multiplex symbols.

18. The method of clause 11, wherein the reference signal is a tracking reference signal, and wherein each of the first reference signal resource and the second reference signal resource corresponds to a single Channel State Information—Reference Signal resource.

19. The method of clause 18, wherein the reference signal is an extended tracking reference signal, and wherein the first reference signal resource corresponds to a first Channel State Information—Reference Signal resource set and the second reference signal resource corresponds to a second Channel State Information—Reference Signal resource set.

20. The method of clause 11, further comprising instructing the transmission point to mute transmission of the first reference signal resource of the at least one of the one or more first orthogonal frequency division multiplex symbols in accordance with the muting pattern.

21. A network entity comprising:
first means for instructing a transmission point to apply a muting pattern regarding transmission of a reference signal comprising a first reference signal resource and a second reference signal resource, wherein a first instance of the first reference signal resource comprises one or more first resource elements across one or more first orthogonal frequency division multiplex symbols within a slot, and a second instance of the second reference signal resource comprises one or more second resource elements across one or more second orthogonal frequency division multiplex symbols within the slot; and
second means for instructing the transmission point to transmit, unmuted, at least one of the one or more second resource elements, of at least one of the one or more second orthogonal frequency division multiplex symbols, despite the muting pattern indicating to mute transmission of the at least one of the one or more second resource elements of the at least one of the one or more second orthogonal frequency division multiplex symbols.

22. The network entity of clause 21, wherein the reference signal comprises multiple reference signal instance sets with each of the multiple reference signal instance sets comprising the first instance and the second instance, and wherein the second means comprise means for instructing the transmission point to transmit, unmuted, all of the one or more second resource elements in each of the multiple reference signal instance sets regardless of the muting pattern.

23. The network entity of clause 22, wherein the second reference signal resource consists of an identical frequency-domain unstaggered plurality of the one or more second resource elements in each of the multiple reference signal instance sets.

24. The network entity of clause 21, wherein the network entity comprises a server, and wherein the second means comprise means for transmitting an indication to the transmission point to transmit, unmuted, the at least one of the one or more second resource elements.

25. The network entity of clause 24, wherein the indication consists of a single bit.

26. The network entity of clause 24, wherein the second reference signal resource comprises one or more second reference signal resources, and wherein the indication comprises one or more bits, each of the one or more bits corresponding to a respective one of the one or more second reference signal resources.

27. The network entity of clause 21, further comprising means for instructing the transmission point to transmit, to a user equipment, a first indication of the muting pattern and a second indication that the at least one of the one or more second resource elements will be transmitted, unmuted, despite the muting pattern indicating to mute transmission of the at least one of the one or more second resource elements of the at least one of the one or more second orthogonal frequency division multiplex symbols.

28. The network entity of clause 21, wherein the reference signal is a tracking reference signal, and wherein each of the first reference signal resource and the second reference signal resource corresponds to a single Channel State Information—Reference Signal resource.

29. The network entity of clause 28, wherein the reference signal is an extended tracking reference signal, and wherein the first reference signal resource corresponds to a first Channel State Information—Reference Signal resource set and the second reference signal resource corresponds to a second Channel State Information—Reference Signal resource set.

30. The network entity of clause 21, further comprising means for instructing the transmission point to mute transmission of the first reference signal resource of the at least one of the one or more first orthogonal frequency division multiplex symbols in accordance with the muting pattern.

31. A non-transitory, processor-readable storage medium comprising processor-readable instructions configured to a cause a processor of a network entity, in order to manage transmission of positioning reference signals, to:
instruct a transmission point to apply a muting pattern regarding transmission of a reference signal comprising a first reference signal resource and a second reference signal resource, wherein a first instance of the first reference signal resource comprises one or more first resource elements across one or more first orthogonal frequency division multiplex symbols within a slot, and a second instance of the second reference signal resource comprises one or more second resource elements across one or more second orthogonal frequency division multiplex symbols within the slot; and
instruct the transmission point to transmit, unmuted, at least one of the one or more second resource elements, of at least one of the one or more second orthogonal frequency division multiplex symbols, despite the muting pattern indicating to mute transmission of the at least one of the one or more second resource elements of the at least one of the one or more second orthogonal frequency division multiplex symbols.

32. The storage medium of clause 31, wherein the reference signal comprises multiple reference signal instance sets with each of the multiple reference signal instance sets comprising the first instance and the second instance, and wherein the processor-readable instructions configured to cause the processor to instruct the transmission point to transmit, unmuted, at least one of the one or more second resource elements comprise processor-readable instructions configured to cause the processor to instruct the transmission point to transmit, unmuted, all of the one or more second resource elements in each of the multiple reference signal instance sets regardless of the muting pattern.

33. The storage medium of clause 32, wherein the second reference signal resource consists of an identical frequency-domain unstaggered plurality of the one or more second resource elements in each of the multiple reference signal instance sets.

34. The storage medium of clause 31, wherein the network entity is a server, and wherein the processor-readable instructions configured to cause the processor to instruct the transmission point to transmit, unmuted, at least one of the one or more second resource elements comprise processor-readable instructions configured to cause the processor to transmit an indication from the server to the transmission point to transmit, unmuted, the at least one of the one or more second resource elements.

35. The storage medium of clause 34, wherein the indication consists of a single bit.

36. The storage medium of clause 34, wherein the second reference signal resource comprises one or more second reference signal resources, and wherein the indication comprises one or more bits, each of the one or more bits corresponding to a respective one of the one or more second reference signal resources.

37. The storage medium of clause 31, wherein the processor-readable instructions comprise instructions configured to cause the processor to instruct the transmission point to transmit, to a user equipment, a first indication of the muting pattern and a second indication that the at least one of the one or more second resource elements will be transmitted, unmuted, despite the muting pattern indicating to mute transmission of the at least one of the one or more second resource elements of the at least one of the one or more second orthogonal frequency division multiplex symbols.

38. The storage medium of clause 31, wherein the reference signal is a tracking reference signal, and wherein each of the first reference signal resource and the second reference signal resource corresponds to a single Channel State Information—Reference Signal resource.

39. The storage medium of clause 38, wherein the reference signal is an extended tracking reference signal, and wherein the first reference signal resource corresponds to a first Channel State Information—Reference Signal resource set and the second reference signal resource corresponds to a second Channel State Information—Reference Signal resource set.

40. The storage medium of clause 31, wherein the processor-readable instructions comprise instructions configured to cause the processor to instruct the transmission point to mute transmission of the first reference signal resource of the at least one of the one or more first orthogonal frequency division multiplex symbols in accordance with the muting pattern.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A network entity comprising:
    a transmitter;
    a memory; and
    a processor communicatively coupled to the transmitter and the memory and configured to:
      instruct a transmission point to apply a muting pattern regarding transmission of a downlink positioning reference signal comprising a first reference signal resource and a second reference signal resource, wherein a first instance of the first reference signal resource comprises one or more first resource elements across one or more first orthogonal frequency division multiplex symbols within a slot, and a second instance of the second reference signal resource comprises one or more second resource elements across one or more second orthogonal frequency division multiplex symbols within the slot, wherein the downlink positioning reference signal comprises multiple reference signal instance sets with each of the multiple reference signal instance sets comprising the first instance and the second instance;
      determine a content of the one or more second resource elements; and
      instruct, based on the content of the one or more second resource elements, the transmission point to transmit, unmuted, all of the one or more second resource elements in each of the multiple reference signal instance sets, of at least one of the one or more second orthogonal frequency division multiplex symbols, despite the muting pattern indicating to mute the transmission of the at least one of the one or more second resource elements of the at least one of the one or more second orthogonal frequency division multiplex symbols.

2. The network entity of claim 1, wherein the second reference signal resource consists of an identical frequency-domain unstaggered plurality of the one or more second resource elements in each instance set of the multiple reference signal instance sets.

3. The network entity of claim 1, wherein the processor is configured to transmit, via the transmitter to the transmission point, an indication to transmit, unmuted, the at least one of the one or more second resource elements.

4. The network entity of claim 3, wherein the indication consists of a single bit.

5. The network entity of claim 3, wherein the second reference signal resource comprises one or more second reference signal resources, and wherein the indication comprises one or more bits, each of the one or more bits corresponding to a respective one of the one or more second reference signal resources.

6. The network entity of claim 1, wherein the processor is configured to instruct the transmission point to transmit, to a user equipment, a first indication of the muting pattern and a second indication that the at least one of the one or more second resource elements will be transmitted, unmuted, despite the muting pattern indicating to mute transmission of the at least one of the one or more second resource elements of the at least one of the one or more second orthogonal frequency division multiplex symbols.

7. The network entity of claim 1, wherein the downlink positioning reference signal is a tracking reference signal, and wherein each of the first reference signal resource and the second reference signal resource corresponds to a single Channel State Information—Reference Signal resource.

8. The network entity of claim 7, wherein the downlink positioning reference signal is an extended tracking reference signal, and wherein the first reference signal resource corresponds to a first Channel State Information—Reference Signal resource set and the second reference signal resource corresponds to a second Channel State Information—Reference Signal resource set.

9. The network entity of claim 1, wherein the processor is configured to instruct the transmission point to mute transmission of the first reference signal resource of the at least one of the one or more first orthogonal frequency division multiplex symbols in accordance with the muting pattern.

10. A method of managing positioning reference signal transmission, the method comprising:
    instructing a transmission point to apply a muting pattern regarding transmission of a downlink positioning reference signal comprising a first reference signal resource and a second reference signal resource, wherein a first instance of the first reference signal resource comprises one or more first resource elements across one or more first orthogonal frequency division multiplex symbols within a slot, and a second instance of the second reference signal resource comprises one or more second resource elements across one or more second orthogonal frequency division multiplex symbols within the slot, wherein the downlink positioning reference signal comprises multiple reference signal instance sets with each of the multiple reference signal instance sets comprising the first instance and the second instance;

determining a content of the one or more second resource elements; and instructing, based on the content of the one or more second resource elements, the transmission point to transmit, unmuted, all of the one or more second resource elements in each of the multiple reference signal instance sets, of at least one of the one or more second orthogonal frequency division multiplex symbols, despite the muting pattern indicating to mute the transmission of the at least one of the one or more second resource elements of the at least one of the one or more second orthogonal frequency division multiplex symbols.

11. The method of claim 10, wherein the second reference signal resource consists of an identical frequency-domain unstaggered plurality of the one or more second resource elements in each instance set of the multiple reference signal instance sets.

12. The method of claim 10, wherein instructing the transmission point to transmit, unmuted, at least one of the one or more second resource elements comprises transmitting an indication from a server to the transmission point to transmit, unmuted, the at least one of the one or more second resource elements.

13. The method of claim 12, wherein the indication consists of a single bit.

14. The method of claim 12, wherein the second reference signal resource comprises one or more second reference signal resources, and wherein the indication comprises one or more bits, each of the one or more bits corresponding to a respective one of the one or more second reference signal resources.

15. The method of claim 10, further comprising instructing the transmission point to transmit, to a user equipment, a first indication of the muting pattern and a second indication that the at least one of the one or more second resource elements will be transmitted, unmuted, despite the muting pattern indicating to mute transmission of the at least one of the one or more second resource elements of the at least one of the one or more second orthogonal frequency division multiplex symbols.

16. The method of claim 10, wherein the downlink positioning reference signal is a tracking reference signal, and wherein each of the first reference signal resource and the second reference signal resource corresponds to a single Channel State Information—Reference Signal resource.

17. The method of claim 16, wherein the downlink positioning reference signal is an extended tracking reference signal, and wherein the first reference signal resource corresponds to a first Channel State Information—Reference Signal resource set and the second reference signal resource corresponds to a second Channel State Information—Reference Signal resource set.

18. The method of claim 10, further comprising instructing the transmission point to mute transmission of the first reference signal resource of the at least one of the one or more first orthogonal frequency division multiplex symbols in accordance with the muting pattern.

19. A network entity comprising:

first means for instructing a transmission point to apply a muting pattern regarding transmission of a downlink positioning reference signal comprising a first reference signal resource and a second reference signal resource, wherein a first instance of the first reference signal resource comprises one or more first resource elements across one or more first orthogonal frequency division multiplex symbols within a slot, and a second instance of the second reference signal resource comprises one or more second resource elements across one or more second orthogonal frequency division multiplex symbols within the slot, wherein the downlink positioning reference signal comprises multiple reference signal instance sets with each of the multiple reference signal instance sets comprising the first instance and the second instance;

means for determining a content of the one or more second resource elements; and second means for instructing the transmission point to transmit, unmuted, based on the content of the one or more second resource elements, all of the one or more second resource elements in each of the multiple reference signal instance sets, of at least one of the one or more second orthogonal frequency division multiplex symbols, despite the muting pattern indicating to mute the transmission of the at least one of the one or more second resource elements of the at least one of the one or more second orthogonal frequency division multiplex symbols.

20. The network entity of claim 19, wherein the second reference signal resource consists of an identical frequency-domain unstaggered plurality of the one or more second resource elements in instance set each of the multiple reference signal instance sets.

21. The network entity of claim 19, wherein the network entity comprises a server, and wherein the second means comprise means for transmitting an indication to the transmission point to transmit, unmuted, the at least one of the one or more second resource elements.

22. The network entity of claim 21, wherein the indication consists of a single bit.

23. The network entity of claim 21, wherein the second reference signal resource comprises one or more second reference signal resources, and wherein the indication comprises one or more bits, each of the one or more bits corresponding to a respective one of the one or more second reference signal resources.

24. The network entity of claim 19, wherein the first means for instructing is further configured to instruct the transmission point to transmit, to a user equipment, a first indication of the muting pattern and a second indication that the at least one of the one or more second resource elements will be transmitted, unmuted, despite the muting pattern indicating to mute transmission of the at least one of the one or more second resource elements of the at least one of the one or more second orthogonal frequency division multiplex symbols.

25. The network entity of claim 19, wherein the downlink positioning reference signal is a tracking reference signal, and wherein each of the first reference signal resource and the second reference signal resource corresponds to a single Channel State Information—Reference Signal resource.

26. The network entity of claim 25, wherein the downlink positioning reference signal is an extended tracking reference signal, and wherein the first reference signal resource corresponds to a first Channel State Information—Reference Signal resource set and the second reference signal resource corresponds to a second Channel State Information—Reference Signal resource set.

27. A non-transitory, processor-readable storage medium comprising processor-readable instructions configured to a cause a processor of a network entity, in order to manage transmission of positioning reference signals, to:
  instruct a transmission point to apply a muting pattern regarding transmission of a downlink positioning reference signal comprising a first reference signal resource and a second reference signal resource, wherein a first instance of the first reference signal resource comprises one or more first resource elements across one or more first orthogonal frequency division multiplex symbols within a slot, and a second instance of the second reference signal resource comprises one or more second resource elements across one or more second orthogonal frequency division multiplex symbols within the slot, wherein the downlink positioning reference signal comprises multiple reference signal instance sets with each of the multiple reference signal instance sets comprising the first instance and the second instance;
  determine a content of the one or more second resource elements; and
  instruct, based on the content of the one or more second resource elements, the transmission point to transmit, unmuted, all of the one or more second resource elements in each of the multiple reference signal instance sets, of at least one of the one or more second orthogonal frequency division multiplex symbols, despite the muting pattern indicating to mute the transmission of the at least one of the one or more second resource elements of the at least one of the one or more second orthogonal frequency division multiplex symbols.

28. A network entity comprising:
  a transmitter;
  a memory; and
  a processor communicatively coupled to the transmitter and the memory and configured to:
    instruct a transmission point to apply a muting pattern in a time period, regarding transmission of a reference signal comprising a first resource set and a second resource set, the muting pattern indicating (i) not to mute a first instance of the first resource set and the second resource set, and (ii) to mute a second instance of the first resource set and the second resource set;
    determine a content of the second resource set; and
    instruct the transmission point in the second instance to mute the first resource set and to transmit, unmuted, based on the content of the second resource set, the second resource set despite the muting pattern indicating to mute the transmission of the second resource set.

29. The network entity of claim 1, wherein the processor is configured to determine whether the content of the one or more second resource elements is a portion of a reference signal expected by a user equipment always to be transmitted unmuted.

* * * * *